US012077176B2

(12) United States Patent
Xu et al.

(10) Patent No.: US 12,077,176 B2
(45) Date of Patent: Sep. 3, 2024

(54) VEHICLE CONTROL METHOD, APPARATUS, AND DEVICE

(71) Applicant: Huawei Technologies Co., Ltd., Shenzhen (CN)

(72) Inventors: Songcen Xu, Shenzhen (CN); Rongfu Zheng, Shenzhen (CN); Liangwei Wang, Shenzhen (CN); Yuzheng Zhuang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 142 days.

(21) Appl. No.: 16/730,444

(22) Filed: Dec. 30, 2019

(65) Prior Publication Data
US 2020/0139989 A1 May 7, 2020

Related U.S. Application Data

(63) Continuation of application No. PCT/CN2017/091095, filed on Jun. 30, 2017.

(51) Int. Cl.
*B60W 60/00* (2020.01)
*B60W 10/04* (2006.01)
(Continued)

(52) U.S. Cl.
CPC .......... *B60W 60/001* (2020.02); *B60W 10/04* (2013.01); *B60W 10/18* (2013.01);
(Continued)

(58) Field of Classification Search
CPC ............................ B60W 60/001; B60W 10/04
See application file for complete search history.

(56) References Cited

U.S. PATENT DOCUMENTS 3,952,829 A * 4/1976 Gray .................... B60K 31/107
361/239
4,161,994 A * 7/1979 Collonia ................ B60K 31/00
123/361
(Continued)

FOREIGN PATENT DOCUMENTS

CN 102470864 A 5/2012
CN 104635736 A 5/2015
(Continued)

OTHER PUBLICATIONS

Machine Translation and Abstract of Chinese Publication No. CN104635736, May 20, 2015, 13 pages.
(Continued)

*Primary Examiner* — Jess Whittington
(74) *Attorney, Agent, or Firm* — Conley Rose, P.C.

(57) ABSTRACT

A vehicle control apparatus and method includes, when a self-driving vehicle is in a self-driving status, obtaining driving status information of the self-driving vehicle and first driving environment information of the self-driving vehicle; calculating a coarse-grained control instruction of the self-driving vehicle based on the driving status information, the first driving environment information, and a control instruction decision model; determining, based on second driving environment information, whether the coarse-grained control instruction is to be executed; and when the coarse-grained control instruction is to be executed, determining, based on lane information and the driving status information of the self-driving vehicle, a fine-grained control instruction corresponding to the coarse-grained control instruction.

19 Claims, 4 Drawing Sheets

(51) Int. Cl.
   *B60W 10/18*   (2012.01)
   *B60W 10/20*   (2006.01)
   *B60W 30/18*   (2012.01)
   *G05D 1/00*    (2006.01)

(52) U.S. Cl.
   CPC ...... *B60W 10/20* (2013.01); *B60W 30/18163* (2013.01); *G05D 1/0088* (2013.01)

(56) References Cited

U.S. PATENT DOCUMENTS

| | | | | |
|---|---|---|---|---|
| 4,597,465 | A | * | 7/1986 | Burney ................ B60K 31/102 |
| | | | | 180/176 |
| 6,393,362 | B1 | * | 5/2002 | Burns .................. G05D 1/0297 |
| | | | | 701/119 |
| 10,870,426 | B2 | * | 12/2020 | Rachor ................ B60W 50/14 |
| 2010/0042282 | A1 | | 2/2010 | Taguchi et al. |
| 2011/0307154 | A1 | | 12/2011 | Takeda et al. |
| 2012/0083947 | A1 | * | 4/2012 | Anderson ............ G08G 1/166 |
| | | | | 701/1 |
| 2012/0221228 | A1 | | 8/2012 | Noumura et al. |
| 2015/0166062 | A1 | * | 6/2015 | Johnson ............... B60W 10/20 |
| | | | | 701/41 |
| 2016/0161950 | A1 | | 6/2016 | Frangou |
| 2016/0272243 | A1 | | 9/2016 | Matsuno et al. |
| 2017/0031361 | A1 | | 2/2017 | Olson et al. |
| 2017/0151958 | A1 | | 6/2017 | Sakuma |
| 2017/0220039 | A1 | | 8/2017 | Funakawa |
| 2018/0050698 | A1 | * | 2/2018 | Polisson ............. B60W 30/182 |
| 2018/0061237 | A1 | * | 3/2018 | Erickson ............. G08G 1/0112 |
| 2018/0240345 | A1 | * | 8/2018 | So ........................... G08G 1/166 |
| 2018/0257539 | A1 | * | 9/2018 | Nabe ..................... B60R 16/027 |
| 2019/0039608 | A1 | * | 2/2019 | Song ..................... B60L 3/0023 |
| 2019/0049981 | A1 | * | 2/2019 | Fischer ................ G05D 1/0011 |

FOREIGN PATENT DOCUMENTS

| | | |
|---|---|---|
| CN | 105189237 A | 12/2015 |
| CN | 105892471 A | 8/2016 |
| CN | 205451512 U | 8/2016 |
| CN | 105984461 A | 10/2016 |
| CN | 106103231 A | 11/2016 |
| WO | 2015145606 A1 | 10/2015 |

OTHER PUBLICATIONS

Machine Translation and Abstract of Chinese Publication No. CN105892471, Aug. 24, 2016, 18 pages.

Machine Translation and Abstract of Chinese Publication No. CN205451512, Aug. 10, 2016, 7 pages.

Zalila., Dr. Z., et al., Longitudinal Control of an Autonomous Vehicle Through a Hybrid Fuzzy/Classical Controller, XP000532569, Sep. 27, 1994, pp. 118-124.

* cited by examiner

VEHICLE CONTROL METHOD, APPARATUS, AND DEVICE

CROSS-REFERENCE TO RELATED APPLICATIONS

This application is a continuation application of International Application No. PCT/CN2017/091095, filed on Jun. 30, 2017, which is hereby incorporated by reference in its entirety.

TECHNICAL FIELD

The disclosure relates to the field of communications technologies, and in particular, to a vehicle control method, apparatus, and device.

BACKGROUND

A self-driving system is an intelligent system integrating many technologies such as automatic control, architecture, artificial intelligence, and visual calculation. In the self-driving system, a control decision system may determine a self-driving policy based on information parsed by a perception system, and then output a corresponding control instruction, to plan a vehicle driving route and control the vehicle during self-driving.

While determining the self-driving policy, the control decision system needs to consider security and comfort for vehicle driving. While ensuring that the vehicle reaches a destination as soon as possible, the control decision system also needs to ensure security in a driving process. Therefore, in the self-driving system, the control decision system is strictly required to control the vehicle during the self-driving to ensure security and reliability.

In other approaches, to ensure security and reliability of the vehicle during self-driving, using a learning algorithm, the control decision system usually performs calculation based on parameters of the self-driving vehicle that are generated when the self-driving vehicle is driving, outputs a control instruction for the self-driving vehicle, such as a steering wheel rotation angle, a value of a throttle, or a brake force, and controls the self-driving vehicle using the output control instruction. However, when the control decision system controls the self-driving of the vehicle using the control instruction, the self-driving vehicle usually conducts unnatural driving behavior. For example, the self-driving vehicle frequently swings from side to side, and even a security accident is caused. Consequently, a security risk may be brought to the self-driving vehicle.

SUMMARY

Embodiments of the disclosure provide a vehicle control method, apparatus, and device, to resolve a problem in other approaches that a security risk may be brought to a self-driving vehicle when the vehicle is controlled using a control instruction during self-driving.

According to a first aspect, an embodiment of the disclosure provides a vehicle control method, including, when a self-driving vehicle is in a self-driving status, obtaining driving status information of the self-driving vehicle and first driving environment information of the self-driving vehicle; calculating a coarse-grained control instruction of the self-driving vehicle based on the driving status information, the first driving environment information, and a control instruction decision model, where the coarse-grained control instruction is used to control a driving manner of the self-driving vehicle, and the control instruction decision model is obtained through training based on training driving status information of the self-driving vehicle in a training status and training driving environment information of the self-driving vehicle in the training status; determining, based on second driving environment information, whether the coarse-grained control instruction is to be executed, where the second driving environment information includes driving environment information corresponding to the coarse-grained control instruction when the self-driving vehicle is in the self-driving status; when the coarse-grained control instruction is to be executed, determining, based on lane information and the driving status information of the self-driving vehicle, a fine-grained control instruction corresponding to the coarse-grained control instruction, where the fine-grained control instruction is used to control a driving parameter of the self-driving vehicle, and the lane information includes information about a lane that corresponds to the coarse-grained control instruction and that is on a road on which the self-driving vehicle drives; and outputting the fine-grained control instruction.

In this embodiment of the disclosure, the coarse-grained control instruction is first calculated using the driving status information, the first driving environment information, and the control instruction decision model, and then it is determined, based on the second driving environment information, whether the coarse-grained control instruction can be executed. In other words, before a driving parameter for controlling the self-driving vehicle is determined, the coarse-grained control instruction is first calculated to calculate the driving manner of the self-driving vehicle. When the coarse-grained control instruction can be executed, the coarse-grained control instruction is converted into the fine-grained control instruction, to avoid outputting an unnecessary control instruction or a faulty control instruction when the vehicle performs automatic control, thereby preventing the self-driving vehicle from conducting unnatural driving behavior or having a security accident. In addition, in this embodiment of the disclosure, after the coarse-grained control instruction can be executed, the coarse-grained control instruction is converted into the fine-grained control instruction based on the driving status information of the self-driving vehicle and the lane information corresponding to the coarse-grained control instruction. In other words, a status of the self-driving vehicle during driving and lane information are fully considered to determine a fine-grained control instruction suitable for controlling the self-driving vehicle, thereby improving accuracy of the fine-grained control instruction and precision for controlling the self-driving vehicle, preventing the self-driving vehicle from conducting the unnatural driving behavior or having the security accident, reducing a security risk of the self-driving vehicle, and further improving security and comfort of the self-driving vehicle.

With reference to the first aspect, in a first possible implementation of the first aspect, the coarse-grained control instruction includes straight driving; the lane information includes a preset expected speed of a lane in which the self-driving vehicle drives straight, and the driving status information of the self-driving vehicle includes a current speed of the self-driving vehicle; and the determining, based on lane information and the driving status information of the self-driving vehicle, a fine-grained control instruction corresponding to the coarse-grained control instruction includes determining the fine-grained control instruction based on the preset expected speed and the current speed.

In this implementation, when the coarse-grained control instruction includes the straight driving, it is possible that only the driving speed of the self-driving vehicle is controlled without a need to control the steering wheel rotation angle of the self-driving vehicle. Therefore, the fine-grained control instruction is determined for the self-driving vehicle based on the current speed of the self-driving vehicle and the preset expected speed of the lane in which the self-driving vehicle drives straight, to improve accuracy of the fine-grained control instruction and precision for controlling the self-driving vehicle, and prevent the self-driving vehicle from conducting unnatural driving behavior such as a side-to-side swing.

With reference to the first aspect or the foregoing possible implementation, in a second possible implementation of the first aspect, the fine-grained control instruction includes a value of a throttle of the self-driving vehicle; the determining the fine-grained control instruction based on the preset expected speed and the current speed includes, when the current speed is greater than the preset expected speed, determining that the value of the throttle is equal to zero; or when the current speed is not greater than the preset expected speed, calculating the value of the throttle of the self-driving vehicle based on a first preset formula, where the first preset formula includes Value of a throttle=Preset throttle control coefficient×(Preset expected speed−Current speed+Preset value).

In this implementation, when the current speed is greater than the preset expected speed, it indicates that the driving speed of the self-driving vehicle is excessively high. Therefore, in this case, the value of the throttle is determined as zero such that the driving speed of the self-driving vehicle is reduced as soon as possible. When the current speed is not greater than the preset expected speed, it indicates that the driving speed of the self-driving vehicle is normal. In this case, the value of the throttle is determined based on a preset throttle control coefficient and a difference between the preset expected speed and the current speed, to accurately control the throttle, thereby ensuring driving security of the self-driving vehicle.

In this implementation, the preset expected speed is not greater than a maximum speed limit of the lane in which the self-driving vehicle drives straight.

With reference to the first aspect or the foregoing possible implementations, in a third possible implementation of the first aspect, the fine-grained control instruction includes a brake force of the self-driving vehicle; the determining the fine-grained control instruction based on the preset expected speed and the current speed includes, when the current speed is less than the preset expected speed, determining that the brake force is equal to zero; or when the current speed is not less than the preset expected speed, calculating the brake force of the self-driving vehicle based on a second preset formula, where the second preset formula includes Brake force=Preset brake control coefficient×(Current speed−Preset expected speed).

In this implementation, when the current speed is less than the preset expected speed, it indicates that the driving speed of the self-driving vehicle is normal. In this case, the self-driving vehicle may not brake. Therefore, the brake force is adjusted as zero. When the current speed is not less than the preset expected speed, it indicates that the driving speed of the self-driving vehicle is excessively high. In this case, the speed of the self-driving vehicle needs to be controlled using a brake. Therefore, the brake force is determined based on a preset brake control coefficient and a difference between the preset expected speed and the current speed, to accurately control the brake, and ensure driving security of the self-driving vehicle.

In this implementation, the preset expected speed is not greater than a maximum speed limit of the lane in which the self-driving vehicle drives straight.

With reference to the first aspect or the foregoing possible implementations, in a fourth possible implementation of the first aspect, the coarse-grained control instruction includes a lane changing direction; and the determining, based on lane information and the driving status information of the self-driving vehicle, a fine-grained control instruction corresponding to the coarse-grained control instruction includes simulating a lane-changing driving path of the self-driving vehicle in the lane changing direction based on the driving status information of the self-driving vehicle; and determining the fine-grained control instruction of the self-driving vehicle based on the lane-changing driving path and the lane information.

In this implementation, when the coarse-grained control instruction includes the lane changing direction, the self-driving vehicle is controlled to change a lane on a side of the lane changing direction. In this case, the lane-changing driving path of the self-driving vehicle is first simulated, in other words, before the self-driving vehicle actually changes the lane, a lane changing path is first determined, and then a fine-grained control instruction of the self-driving vehicle during lane changing is determined based on the predetermined lane changing path and lane information, to improve accuracy of the fine-grained control instruction and precision for controlling the self-driving vehicle, thereby improving security of the self-driving vehicle during lane changing.

With reference to the first aspect or the foregoing possible implementations, in a fifth possible implementation of the first aspect, the fine-grained control instruction includes a steering wheel rotation angle; the lane information includes a lane width of a lane corresponding to the lane-changing driving path and a lane middle line of the lane corresponding to the lane-changing driving path; and the determining the fine-grained control instruction of the self-driving vehicle based on the lane-changing driving path and the lane information includes determining, in the lane-changing driving path, at least one steering angle between a driving direction of the self-driving vehicle and a straight driving direction of a lane in which the self-driving vehicle is currently located; determining, in the lane-changing driving path based on the lane width of the lane corresponding to the lane-changing driving path, a target lane width of a lane to which the self-driving vehicle at a position corresponding to the steering angle belongs; determining, in the lane-changing driving path based on the lane middle line of the lane corresponding to the lane-changing driving path, a target distance between the self-driving vehicle at the position corresponding to the steering angle and a lane middle line of the lane to which the self-driving vehicle belongs; and calculating the steering wheel rotation angle based on a third preset formula, the steering angle, the target lane width, and the target distance, where the third preset formula includes Steering wheel rotation angle=[Steering angle−Target distance/(Target lane width×First steering angle coefficient)]×Second steering angle coefficient.

In this implementation, the steering wheel rotation angle of the self-driving vehicle needs to be controlled because the lane-changing driving path of the self-driving vehicle is a curve. Therefore, a discrete required steering position and steering angle of the self-driving vehicle during lane changing may be determined based on the pre-simulated lane-changing driving path, and then a rotation angle of the steering wheel at each corresponding steering angle is determined with reference to information about a lane corresponding to each steering angle in the lane-changing driving path, and in other words, an angle by which the steering wheel of the self-driving vehicle needs to be rotated during the lane changing is determined, thereby accurately controlling the steering wheel and ensuring driving security of the self-driving vehicle.

In this implementation, the preset expected speed is not greater than a maximum speed limit of the lane in which the self-driving vehicle drives straight. A value range of the steering wheel rotation angle may be greater than or equal to −1 and less than or equal to 1.

With reference to the first aspect or the foregoing possible implementations, in a sixth possible implementation of the first aspect, the fine-grained control instruction further includes a value of a throttle of the self-driving vehicle; the lane information includes a preset expected speed of the lane corresponding to the lane-changing driving path; and after the determining, in the lane-changing driving path, at least one steering angle between a driving direction of the self-driving vehicle and a straight driving direction of a lane in which the self-driving vehicle is currently located, the method further includes determining, in the lane-changing driving path based on the driving status information of the self-driving vehicle, a current speed of the self-driving vehicle at the position corresponding to the steering angle; determining, in the lane-changing driving path based on the preset expected speed of the lane corresponding to the lane-changing driving path, a target preset expected speed of the lane to which the self-driving vehicle at the position corresponding to the steering angle belongs; and when the current speed is greater than the target preset expected speed, determining that the value of the throttle is equal to zero; or when the current speed is not greater than the target preset expected speed, calculating, based on a fourth preset formula, the value of the throttle of the self-driving vehicle at the position corresponding to the steering angle, where the fourth preset formula includes Value of a throttle=Preset throttle control coefficient×(Target preset expected speed−Current speed+Preset value).

In this implementation, when the self-driving vehicle changes a lane, the driving speed may be further controlled. When the current speed is greater than the target preset expected speed, the value of the throttle is determined as zero, to reduce the driving speed of the self-driving vehicle as soon as possible; or when the current speed is not greater than the target preset expected speed, the value of the throttle is determined based on the preset throttle control coefficient and a difference between the target preset expected speed and the current speed, to accurately control the throttle and ensure driving security of the self-driving vehicle.

In this implementation, the target preset expected speed is not greater than a maximum speed limit of the lane corresponding to the lane-changing driving path.

With reference to the first aspect or the foregoing possible implementations, in a seventh possible implementation of the first aspect, the fine-grained control instruction further includes a brake force of the self-driving vehicle; the lane information further includes the preset expected speed of the lane corresponding to the lane-changing driving path; and after the determining, in the lane-changing driving path, at least one steering angle between a driving direction of the self-driving vehicle and a straight driving direction of a lane in which the self-driving vehicle is currently located, the method further includes determining, in the lane-changing driving path based on the driving status information of the self-driving vehicle, a current speed of the self-driving vehicle in a lane to which the self-driving vehicle at the position corresponding to the steering angle belongs; determining, in the lane-changing driving path based on the preset expected speed of the lane corresponding to the lane-changing driving path, a target preset expected speed of the self-driving vehicle at the position corresponding to the steering angle; and when the current speed is less than the target preset expected speed, determine that the brake force is equal to zero; or when the current speed is not less than the target preset expected speed, calculating, based on a fifth preset formula, a brake force of the self-driving vehicle at the position corresponding to the steering angle, where the fifth preset formula includes Brake force=Preset brake control coefficient×(Current speed−Target preset expected speed).

In this implementation, when the self-driving vehicle changes a lane, the driving speed may be further controlled. When the current speed is less than the target preset expected speed, the self-driving vehicle may not be braked, and therefore, the brake force is adjusted to zero; or when the current speed is not less than the target preset expected speed, the speed of the self-driving vehicle needs to be controlled using the brake. Therefore, the brake force is determined based on the preset brake control coefficient and a difference between the target preset expected speed and the current speed, to accurately control the brake and ensure driving security of the self-driving vehicle.

In the foregoing implementations, the target preset expected speed is not greater than a maximum speed limit of the lane corresponding to the lane-changing driving path. A value range of the value of the throttle may be greater than or equal to 0 and less than or equal to 1. A value range of the brake force may be greater than or equal to 0 and less than or equal to 1. The preset value may be 1.

With reference to the first aspect or the foregoing possible implementations, in an eighth possible implementation of the first aspect, the first driving environment information includes at least one of lane information of a lane in which the self-driving vehicle drives, information about a vehicle within a preset distance of the self-driving vehicle, and information about a road within the preset distance of the self-driving vehicle; and the second driving environment information includes at least one of lane information that corresponds to the coarse-grained control instruction and that is of the lane in which the self-driving vehicle drives, information that corresponds to the coarse-grained control instruction and that is about the vehicle within the preset distance of the self-driving vehicle, and information that corresponds to the coarse-grained control instruction and that is about the road within the preset distance of the self-driving vehicle.

With reference to the first aspect or the foregoing possible implementations, in a ninth possible implementation of the first aspect, the second driving environment information includes a first vehicle distance between a target vehicle and the self-driving vehicle, and the target vehicle represents a vehicle that corresponds to the coarse-grained control instruction and that is within the preset distance of the self-driving vehicle; and the determining, based on second driving environment information, whether the coarse-grained control instruction is to be executed includes, when the first vehicle distance is greater than a secure distance, determining that the coarse-grained control instruction is to be executed; or when the first vehicle distance is not greater than a secure distance, determining that the coarse-grained control instruction is not to be executed.

In this implementation, after the coarse-grained control instruction is calculated, in consideration of security, whether the coarse-grained control instruction is to be executed may be determined by determining whether the vehicle that corresponds to the coarse-grained control instruction and that is within the preset distance of the self-driving vehicle affects security of the self-driving vehicle, namely, determining whether the first vehicle distance between the target vehicle and the self-driving vehicle reaches the secure distance. The first vehicle distance is compared with the secure distance such that security of the self-driving vehicle during self-driving can be effectively improved and a security accident caused because the self-driving vehicle executes a faulty control instruction or an unnecessary control instruction is avoided.

With reference to the first aspect or the foregoing possible implementations, in a tenth possible implementation of the first aspect, the coarse-grained control instruction includes a lane changing direction; before the determining, based on second driving environment information, whether the coarse-grained control instruction is to be executed, the method further includes simulating a lane-changing driving path of the self-driving vehicle in the lane changing direction based on the driving status information of the self-driving vehicle, where the second driving environment information includes a second vehicle distance between a target vehicle and the self-driving vehicle when the self-driving vehicle is driving on the lane-changing driving path, and the target vehicle represents a vehicle that corresponds to the coarse-grained control instruction and that is within the preset distance of the self-driving vehicle; and the determining, based on second driving environment information, whether the coarse-grained control instruction is to be executed includes, when the second vehicle distance is greater than a secure distance, determining that the coarse-grained control instruction is to be executed; or when the second vehicle distance is not greater than a secure distance, determining that the coarse-grained control instruction is not to be executed.

In this implementation, when the coarse-grained control instruction includes the lane changing direction, the lane-changing driving path of the self-driving vehicle may be first simulated, and then it is determined, based on the second vehicle distance between the target vehicle and the self-driving vehicle when the self-driving vehicle is driving on the lane-changing driving path, whether the coarse-grained control instruction is to be executed, thereby improving accuracy of determining and security of the self-driving vehicle during self-driving.

In the foregoing embodiment, the secure distance may be a distance meeting a requirement that the self-driving vehicle does not come into contact with the target vehicle within a preset time period while the self-driving vehicle drives at a current speed of the self-driving vehicle and the target vehicle drives at a current speed of the target vehicle.

With reference to the first aspect or the foregoing possible implementations, in an eleventh possible implementation of the first aspect, before the calculating a coarse-grained control instruction of the self-driving vehicle based on the driving status information, the first driving environment information, and a control instruction decision model, the method further includes initializing a model parameter of the control instruction decision model; obtaining a training parameter, where the training parameter includes the training driving status information and the training driving environment information; calculating a coarse-grained training control instruction of the self-driving vehicle based on the model parameter and the training parameter; calculating a value of a loss function based on the coarse-grained training control instruction; updating the model parameter when the value of the loss function does not meet a preset condition; calculating an updated coarse-grained training control instruction of the self-driving vehicle based on an updated model parameter and the training parameter, and recalculating the value of the loss function until the value of the loss function meets the preset condition; and determining a model parameter corresponding to the value of the loss function that meets the preset condition as a final model parameter of the control instruction decision model.

With reference to the first aspect or the foregoing possible implementations, in a twelfth possible implementation of the first aspect, the loss function Loss1 includes Loss1=$|v \cos \alpha - v \sin \alpha - Q|^2$, where v represents a current speed of the self-driving vehicle, $\alpha$ represents an angle between a current driving direction of the self-driving vehicle and a lane in which the self-driving vehicle is located, and Q represents a matching degree between the coarse-grained training control instruction and a preset coarse-grained training control instruction corresponding to the training parameter.

With reference to the first aspect or the foregoing possible implementations, in a thirteenth possible implementation of the first aspect, before the updating the model parameter, the method further includes calculating an updating gradient of the model parameter; and the updating the model parameter includes calculating the updated model parameter based on the updating gradient, a preset updating coefficient, and the model parameter on which updating is to be performed.

With reference to the first aspect or the foregoing possible implementations, in a fourteenth possible implementation of the first aspect, before the calculating an updating gradient of the model parameter, the method further includes determining whether the coarse-grained training control instruction is to be executed; and the calculating an updating gradient of the model parameter includes, when the coarse-grained training control instruction is to be executed, calculating the updating gradient using a first preset relationship, where the first preset relationship indicates that the updating gradient is equal to a partial derivative value of a first loss function with respective to the model parameter, and the first loss function is as follows. Loss1=$|v \cos \alpha - v \sin \alpha - Q|^2$, where v represents a current speed of the self-driving vehicle, $\alpha$ represents an angle between a current driving direction of the self-driving vehicle and a lane in which the self-driving vehicle is located, and Q represents a matching degree between the coarse-grained training control instruction and a preset coarse-grained training control instruction corresponding to the training parameter; or when the coarse-grained training control instruction is not to be executed, calculating the updating gradient using a second preset relationship, where the second preset relationship indicates that the updating gradient is equal to a partial derivative value of a second loss function with respective to the model parameter, and the second loss function is as follows. Loss2=$|v \sin \alpha - v \cos \alpha - Q|^2$.

According to a second aspect, an embodiment of the disclosure provides a vehicle control apparatus, including an obtaining unit configured to, when a self-driving vehicle is in a self-driving status, obtain driving status information of the self-driving vehicle and first driving environment information of the self-driving vehicle; a calculation unit configured to calculate a coarse-grained control instruction of the self-driving vehicle based on the driving status information, the first driving environment information, and a control instruction decision model, where the coarse-grained control instruction is used to control a driving manner of the self-driving vehicle, and the control instruction decision model is obtained through training based on training driving status information of the self-driving vehicle in a training status and training driving environment information of the self-driving vehicle in the training status; a judging unit configured to determine, based on second driving environment information, whether the coarse-grained control instruction is to be executed, where the second driving environment information includes driving environment information corresponding to the coarse-grained control instruction when the self-driving vehicle is in the self-driving status; a determining unit configured to, when the coarse-grained control instruction is to be executed, determine, based on lane information and the driving status information of the self-driving vehicle, a fine-grained control instruction corresponding to the coarse-grained control instruction, where the fine-grained control instruction is used to control a driving parameter of the self-driving vehicle, and the lane information includes information about a lane that corresponds to the coarse-grained control instruction and that is on a road on which the self-driving vehicle drives; and an output unit configured to output the fine-grained control instruction.

In this embodiment of the disclosure, the control apparatus first calculates the coarse-grained control instruction using the driving status information, the first driving environment information, and the control instruction decision model, and then determines, based on the second driving environment information, whether the coarse-grained control instruction can be executed. In other words, before determining the driving parameter for controlling the self-driving vehicle, the control apparatus first calculates the coarse-grained control instruction to calculate the driving manner of the self-driving vehicle. When determining that the coarse-grained control instruction can be executed, the control apparatus further converts the coarse-grained control instruction into the fine-grained control instruction, to avoid outputting an unnecessary control instruction or a faulty control instruction when the vehicle performs automatic control, thereby preventing the self-driving vehicle from conducting unnatural driving behavior or having a security accident. In addition, in this embodiment of the disclosure, after determining that the coarse-grained control instruction can be executed, the control apparatus converts the coarse-grained control instruction into the fine-grained control instruction based on the driving status information of the self-driving vehicle and the lane information corresponding to the coarse-grained control instruction. In other words, a status of the self-driving vehicle during driving and lane information are fully considered to determine a fine-grained control instruction suitable for controlling the self-driving vehicle, thereby improving accuracy of the fine-grained control instruction and precision for controlling the self-driving vehicle, preventing the self-driving vehicle from conducting the unnatural driving behavior or having the security accident, reducing a security risk of the self-driving vehicle, and further improving security and comfort of the self-driving vehicle.

With reference to the second aspect, in a first possible implementation of the second aspect, the coarse-grained control instruction includes straight driving; the lane information includes a preset expected speed of a lane in which the self-driving vehicle drives straight, and the driving status information of the self-driving vehicle includes a current speed of the self-driving vehicle; and the determining unit is configured to determine the fine-grained control instruction based on the preset expected speed and the current speed.

In this implementation, when the coarse-grained control instruction includes straight driving, the control apparatus may control only the driving speed of the self-driving vehicle without a need to control the steering wheel rotation angle of the self-driving vehicle. Therefore, the fine-grained control instruction is determined for the self-driving vehicle based on the current speed of the self-driving vehicle and the preset expected speed of the lane in which the self-driving vehicle drives straight, to improve accuracy of the fine-grained control instruction and precision for controlling the self-driving vehicle, and prevent the self-driving vehicle from conducting unnatural driving behavior such as a side-to-side swing.

With reference to the second aspect or the foregoing possible implementation, in a second possible implementation of the second aspect, the fine-grained control instruction includes a value of a throttle of the self-driving vehicle; and the determining unit is configured to, when the current speed is greater than the preset expected speed, determining that the value of the throttle is equal to zero; or when the current speed is not greater than the preset expected speed, calculate the value of the throttle of the self-driving vehicle based on a first preset formula, where the first preset formula includes Value of a throttle=Preset throttle control coefficient×(Preset expected speed−Current speed+Preset value).

In this implementation, when the current speed is greater than the preset expected speed, it indicates that the driving speed of the self-driving vehicle is excessively high. Therefore, in this case, the control apparatus determines the value of the throttle as zero such that the driving speed of the self-driving vehicle is reduced as soon as possible. When the current speed is not greater than the preset expected speed, it indicates that the driving speed of the self-driving vehicle is normal. In this case, the control apparatus determines the value of the throttle based on a preset throttle control coefficient and a difference between the preset expected speed and the current speed, to accurately control the throttle, thereby ensuring driving security of the self-driving vehicle.

In this implementation, the preset expected speed is not greater than a maximum speed limit of the lane in which the self-driving vehicle drives straight.

With reference to the second aspect or the foregoing possible implementations, in a third possible implementation of the second aspect, the fine-grained control instruction includes a brake force of the self-driving vehicle; and the determining unit is configured to, when the current speed is less than the preset expected speed, determining that the brake force is equal to zero; or when the current speed is not less than the preset expected speed, calculate the brake force of the self-driving vehicle based on a second preset formula, where the second preset formula includes Brake force=Preset brake control coefficient×(Current speed−Preset expected speed).

In this implementation, when the current speed is less than the preset expected speed, it indicates that the driving speed of the self-driving vehicle is normal. In this case, the control apparatus may not brake. Therefore, the brake force is adjusted as zero. When the current speed is not less than the preset expected speed, it indicates that the driving speed of the self-driving vehicle is excessively high. In this case, the control apparatus needs to control the speed of the self-driving vehicle using a brake. Therefore, the brake force is determined based on a preset brake control coefficient and a difference between the preset expected speed and the current speed, to accurately control the brake, and ensure driving security of the self-driving vehicle.

In this implementation, the preset expected speed is not greater than a maximum speed limit of the lane in which the self-driving vehicle drives straight.

With reference to the second aspect or the foregoing possible implementations, in a fourth possible implementation of the second aspect, the coarse-grained control instruction includes a lane changing direction; and the determining unit is configured to simulate a lane-changing driving path of the self-driving vehicle in the lane changing direction based on the driving status information of the self-driving vehicle; and determine the fine-grained control instruction of the self-driving vehicle based on the lane-changing driving path and the lane information.

In this implementation, when the coarse-grained control instruction includes the lane changing direction, the control apparatus controls the self-driving vehicle to change a lane on a side of the lane changing direction. In this case, the lane-changing driving path of the self-driving vehicle is first simulated, in other words, before the self-driving vehicle actually changes the lane, a lane changing path is first determined, and then a fine-grained control instruction of the self-driving vehicle during lane changing is determined based on the predetermined lane changing path and lane information, to improve accuracy of the fine-grained control instruction and precision for controlling the self-driving vehicle, thereby improving security of the self-driving vehicle during lane changing.

With reference to the second aspect or the foregoing possible implementations, in a fifth possible implementation of the second aspect, the fine-grained control instruction includes a steering wheel rotation angle; the lane information includes a lane width of a lane corresponding to the lane-changing driving path and a lane middle line of the lane corresponding to the lane-changing driving path; and the determining unit is configured to determine, in the lane-changing driving path, at least one steering angle between a driving direction of the self-driving vehicle and a straight driving direction of a lane in which the self-driving vehicle is currently located; determine, in the lane-changing driving path based on the lane width of the lane corresponding to the lane-changing driving path, a target lane width of a lane to which the self-driving vehicle at a position corresponding to the steering angle belongs; determine, in the lane-changing driving path based on the lane middle line of the lane corresponding to the lane-changing driving path, a target distance between the self-driving vehicle at the position corresponding to the steering angle and a lane middle line of the lane to which the self-driving vehicle belongs; and calculate the steering wheel rotation angle based on a third preset formula, the steering angle, the target lane width, and the target distance, where the third preset formula includes Steering wheel rotation angle=[Steering angle−Target distance/(Target lane width×First steering angle coefficient)]× Second steering angle coefficient.

In this implementation, the control apparatus needs to control the steering wheel rotation angle of the self-driving vehicle because the lane-changing driving path of the self-driving vehicle is a curve. Therefore, a required steering position and steering angle of the self-driving vehicle during lane changing may be determined based on the pre-simulated lane-changing driving path, and then a rotation angle of the steering wheel at each corresponding steering angle is determined with reference to information about a lane corresponding to each steering angle in the lane-changing driving path, and in other words, an angle by which the steering wheel of the self-driving vehicle needs to be rotated during the lane changing is determined, thereby accurately controlling the steering wheel and ensuring driving security of the self-driving vehicle.

In this implementation, the preset expected speed is not greater than a maximum speed limit of the lane in which the self-driving vehicle drives straight. A value range of the steering wheel rotation angle may be greater than or equal to −1 and less than or equal to 1.

With reference to the second aspect or the foregoing possible implementations, in a sixth possible implementation of the second aspect, the fine-grained control instruction further includes a value of a throttle of the self-driving vehicle; the lane information further includes a preset expected speed of a lane corresponding to the lane-changing driving path; and the determining unit is configured to determine, in the lane-changing driving path based on the driving status information of the self-driving vehicle, a current speed of the self-driving vehicle at the position corresponding to the steering angle; determine, in the lane-changing driving path based on the preset expected speed of the lane corresponding to the lane-changing driving path, a target preset expected speed of the lane to which the self-driving vehicle at the position corresponding to the steering angle belongs; and when the current speed is greater than the target preset expected speed, determine that the value of the throttle is equal to zero; or when the current speed is not greater than the target preset expected speed, calculate, based on a fourth preset formula, the value of the throttle of the self-driving vehicle at the position corresponding to the steering angle, where the fourth preset formula includes Value of a throttle=Preset throttle control coefficient×(Target preset expected speed−Current speed+ Preset value).

In this implementation, when the self-driving vehicle changes a lane, the control apparatus may further control the driving speed. When the current speed is greater than the target preset expected speed, the value of the throttle is determined as zero, to reduce the driving speed of the self-driving vehicle as soon as possible; or when the current speed is not greater than the target preset expected speed, the value of the throttle is determined based on the preset throttle control coefficient and a difference between the target preset expected speed and the current speed, to accurately control the throttle and ensure driving security of the self-driving vehicle.

In this implementation, the target preset expected speed is not greater than a maximum speed limit of the lane corresponding to the lane-changing driving path.

With reference to the second aspect or the foregoing possible implementations, in a seventh possible implementation of the second aspect, the fine-grained control instruction further includes a brake force of the self-driving vehicle; the lane information further includes a preset expected speed of a lane corresponding to the lane-changing driving path; and the determining unit is configured to determine, in the lane-changing driving path based on the driving status information of the self-driving vehicle, a current speed of the self-driving vehicle at the position corresponding to the steering angle; determine, in the lane-changing driving path based on the preset expected speed of the lane corresponding to the lane-changing driving path, a target preset expected speed of the lane to which the self-driving vehicle at the position corresponding to the steering angle belongs; and when the current speed is less than the target preset expected speed, determine that the brake force is equal to zero; or when the current speed is not less than the target preset expected speed, calculate, based on a fifth preset formula, a brake force of the self-driving vehicle at the position corresponding to the steering angle, where the fifth preset formula includes Brake force=Preset brake control coefficient×(Current speed−Target preset expected speed).

In this implementation, when the self-driving vehicle changes a lane, the control apparatus may further control the driving speed. When the current speed is less than the target preset expected speed, the self-driving vehicle may not be braked, and therefore, the brake force is adjusted to zero; or when the current speed is not less than the target preset expected speed, the speed of the self-driving vehicle needs to be controlled using the brake. Therefore, the brake force is determined based on the preset brake control coefficient and a difference between the target preset expected speed and the current speed, to accurately control the brake and ensure driving security of the self-driving vehicle.

In the foregoing implementations, the target preset expected speed is not greater than a maximum speed limit of the lane corresponding to the lane-changing driving path. A value range of the value of the throttle may be greater than or equal to 0 and less than or equal to 1. A value range of the brake force may be greater than or equal to 0 and less than or equal to 1. The preset value may be 1.

With reference to the second aspect or the foregoing possible implementations, in an eighth possible implementation of the second aspect, the first driving environment information includes at least one of lane information of a lane in which the self-driving vehicle drives, information about a vehicle within a preset distance of the self-driving vehicle, and information about a road within the preset distance of the self-driving vehicle; and the second driving environment information includes at least one of lane information that corresponds to the coarse-grained control instruction and that is of the lane in which the self-driving vehicle drives, information that corresponds to the coarse-grained control instruction and that is about vehicle within the preset distance of the self-driving vehicle, and information that corresponds to the coarse-grained control instruction and that is about road within the preset distance of the self-driving vehicle.

With reference to the second aspect or the foregoing possible implementations, in a ninth possible implementation of the second aspect, the second driving environment information includes a first vehicle distance between a target vehicle and the self-driving vehicle, and the target vehicle represents a vehicle that corresponds to the coarse-grained control instruction and that is within the preset distance of the self-driving vehicle; and the judging unit is configured to, when the first vehicle distance is greater than a secure distance, determine that the coarse-grained control instruction is to be executed; or when the first vehicle distance is not greater than a secure distance, determine that the coarse-grained control instruction is not to be executed.

In this implementation, after the coarse-grained control instruction is calculated, in consideration of security, the control apparatus may determine, by determining whether the vehicle that corresponds to the coarse-grained control instruction and that is within the preset distance of the self-driving vehicle affects security of the self-driving vehicle, whether the coarse-grained control instruction is to be executed, namely, by determining whether the first vehicle distance between the target vehicle and the self-driving vehicle reaches the secure distance. The first vehicle distance is compared with the secure distance, and the coarse-grained control instruction is not to be executed when the first vehicle distance does not reach the secure distance, and the coarse-grained control instruction is to be executed only when the first vehicle distance reaches the secure distance, thereby effectively improving security of the self-driving vehicle during self-driving and avoiding a security accident caused because the self-driving vehicle executes a faulty control instruction or an unnecessary control instruction.

With reference to the second aspect or the foregoing possible implementations, in a tenth possible implementation of the second aspect, the coarse-grained control instruction includes a lane changing direction, and the apparatus further includes a simulating unit configured to simulate a lane-changing driving path of the self-driving vehicle in the lane changing direction based on the driving status information of the self-driving vehicle, where the second driving environment information includes a second vehicle distance between a target vehicle and the self-driving vehicle when the self-driving vehicle is driving on the lane-changing driving path, and the target vehicle represents a vehicle that corresponds to the coarse-grained control instruction and that is within the preset distance of the self-driving vehicle; and the judging unit is configured to, when the second vehicle distance is greater than a secure distance, determine that the coarse-grained control instruction is to be executed; or when the second vehicle distance is not greater than a secure distance, determine that the coarse-grained control instruction is not to be executed.

In this implementation, when the coarse-grained control instruction includes the lane changing direction, the control apparatus may first simulate the lane-changing driving path of the self-driving vehicle, and then determine, based on the second vehicle distance between the target vehicle and the self-driving vehicle when the self-driving vehicle is driving on the lane-changing driving path, whether the coarse-grained control instruction is to be executed, thereby improving accuracy of determining and security of the self-driving vehicle during self-driving.

In the foregoing embodiment, the secure distance may be a distance meeting a requirement that the self-driving vehicle does not come into contact with the target vehicle within a preset time period while the self-driving vehicle drives at a current speed of the self-driving vehicle and the target vehicle drives at a current speed of the target vehicle.

With reference to the second aspect or the foregoing possible implementations, in an eleventh possible implementation of the second aspect, the method further includes an initialization unit configured to initialize a model parameter of the control instruction decision model, where the obtaining unit is further configured to obtain a training parameter, where the training parameter includes the training driving status information and the training driving environment information; the calculation unit is further configured to calculate a coarse-grained training control instruction of the self-driving vehicle based on the model parameter and the training parameter; and calculate a value of a loss function based on the coarse-grained training control instruction; and the apparatus further includes an updating unit configured to update the model parameter when the value of the loss function does not meet a preset condition, where the calculation unit is further configured to calculate an updated coarse-grained training control instruction of the self-driving vehicle based on an updated model parameter and the training parameter, and recalculate the value of the loss function until the value of the loss function meets the preset condition; and the determining unit is further configured to determine a model parameter corresponding to the value of the loss function that meets the preset condition as a final model parameter of the control instruction decision model.

With reference to the second aspect or the foregoing possible implementations, in a twelfth possible implementation of the second aspect, the loss function Loss1 includes Loss1=$|v \cos \alpha - v \sin \alpha - Q|^2$, where v represents a current speed of the self-driving vehicle, α represents an angle between a current driving direction of the self-driving vehicle and a lane in which the self-driving vehicle is located, and Q represents a matching degree between the coarse-grained training control instruction and a preset coarse-grained training control instruction corresponding to the training parameter.

With reference to the second aspect or the foregoing possible implementations, in a thirteenth possible implementation of the second aspect, the calculation unit is further configured to calculate an updating gradient of the model parameter; and the updating unit is configured to calculate the updated model parameter based on the updating gradient, a preset updating coefficient, and the model parameter on which updating is to be performed.

With reference to the second aspect or the foregoing possible implementations, in a fourteenth possible implementation of the second aspect, the judging unit is further configured to determine whether the coarse-grained training control instruction is to be executed; and the calculation unit is configured to, when the coarse-grained training control instruction is to be executed, calculate the updating gradient using a first preset relationship, where the first preset relationship indicates that the updating gradient is equal to a partial derivative value of a first loss function with respective to the model parameter, and the first loss function is as follows. Loss1=$|v \cos \alpha - v \sin \alpha - Q|^2$, where v represents a current speed of the self-driving vehicle, α represents an angle between a current driving direction of the self-driving vehicle and a lane in which the self-driving vehicle is located, and Q represents a matching degree between the coarse-grained training control instruction and a preset coarse-grained training control instruction corresponding to the training parameter; or when the coarse-grained training control instruction is not to be executed, calculate the updating gradient using a second preset relationship, where the second preset relationship indicates that the updating gradient is equal to a partial derivative value of a second loss function with respective to the model parameter, and the second loss function is as follows. Loss2=$|v \sin \alpha - v \cos \alpha - Q|^2$.

According to a third aspect, an embodiment of the disclosure provides a vehicle control device, including a memory, a processor, and a bus, where the memory and the processor are connected and complete mutual communication using the bus; the memory is configured to store program code; and the processor runs, by reading executable program code stored in the memory, a program corresponding to the executable program code, to perform the method according to the first aspect.

According to a fourth aspect, an embodiment of the disclosure provides a computer-readable storage medium, the computer-readable storage medium stores an instruction, and when the instruction runs on a computer, the computer performs the method according to the first aspect.

According to a fifth aspect, an embodiment of the disclosure provides a computer program product including an instruction, and when the computer program product runs on a computer, the computer performs the method according to the first aspect.

According to a sixth aspect, an embodiment of the disclosure provides a computer program, and when the computer program runs on a computer, the computer performs the method according to the first aspect.

BRIEF DESCRIPTION OF THE DRAWINGS

To describe the technical solutions in the embodiments of the disclosure more clearly, the following briefly describes the accompanying drawings required for describing the embodiments of the disclosure.

DESCRIPTION OF EMBODIMENTS

To make the purpose, technical solutions, and advantages of the embodiments of the disclosure clearer, the following describes the technical solutions of the embodiments of the disclosure with reference to the accompanying drawings in the embodiments of the disclosure.

The embodiments of the disclosure are applicable to a scenario in which self-driving controlling is performed on a vehicle. In the embodiments of the disclosure, a self-driving vehicle may be controlled by a control decision system, and the control decision system may be divided into two parts. The two parts are respectively an enhanced learning layer and a moving track security control layer. The enhanced learning layer may calculate a coarse-grained control instruction using a driving policy decision model and based on obtained information related to the self-driving vehicle, and then transmit the coarse-grained control instruction to the moving track security control layer. The moving track security control layer may determine, from a perspective of driving security, whether the coarse-grained control instruction is to be executed. When determining that the coarse-grained control instruction is to be executed, the moving track security control layer converts the coarse-grained control instruction into a fine-grained control instruction, namely, a specific driving parameter for controlling driving of the self-driving vehicle, and outputs the fine-grained control instruction to a vehicle control system, to control self-driving of the vehicle.

Figure 1:
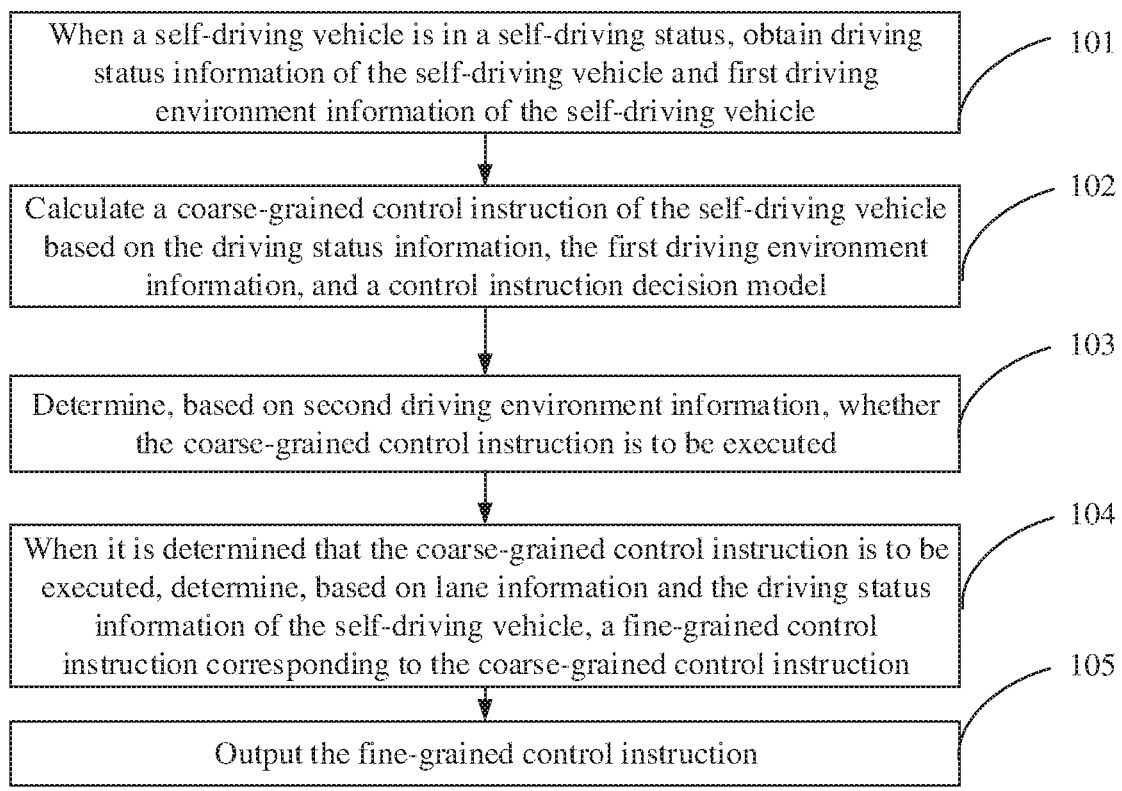
FIG. 1 is a schematic flowchart of a vehicle control method according to an embodiment of the disclosure.

FIG. 1 is a schematic flowchart of a vehicle control method according to an embodiment of the disclosure. As shown in FIG. 1, the method includes the following steps 101 to 105.

101. When a self-driving vehicle is in a self-driving status, obtain driving status information of the self-driving vehicle and first driving environment information of the self-driving vehicle.

When the self-driving vehicle is in the self-driving status, the driving status information and the first driving environment information of the self-driving vehicle may be obtained in real time, and then a coarse-grained control instruction of the self-driving vehicle is calculated based on the obtained driving status information and first driving environment information.

In this embodiment of the disclosure, the first driving environment information may include at least one of lane information of a lane in which the self-driving vehicle drives, information about a vehicle within a preset distance of the self-driving vehicle, and information about a road within the preset distance of the self-driving vehicle. The lane information may include a maximum speed limit of the lane, a width of the lane, and the like. The information about the vehicle may include a quantity of vehicles, a vehicle driving direction, a distance between the vehicle and the self-driving vehicle, and the like. The information about the road may include information about an isolation facility on the road, information about an obstacle on the road, and the like. The driving status information of the self-driving vehicle may include a position of the self-driving vehicle, a speed of the self-driving vehicle, a driving direction of the self-driving vehicle, an angle between the self-driving vehicle and the lane in which the self-driving vehicle drives, and the like.

It should be noted that a manner of obtaining the driving status information and the first driving environment information is not limited in this step, and may include a manner in which various sensors such as a laser radar, an ultrasonic radar, and a millimeter wave radar, an in-vehicle camera, a global positioning system (GPS), a map, onboard diagnostics (OBD) data of the self-driving vehicle, and the like are used.

102. Calculate a coarse-grained control instruction of the self-driving vehicle based on the driving status information, the first driving environment information, and a control instruction decision model.

The coarse-grained control instruction is used to control a driving manner of the self-driving vehicle, and the control instruction decision model is obtained after training is performed based on training driving status information of the self-driving vehicle in a training status and training driving environment information of the self-driving vehicle in the training status.

In this embodiment of the disclosure, the driving manner may include straight driving, lane changing, a U-turn, a turn, and the like. The coarse-grained control instruction may include the straight driving or the lane changing, and when the coarse-grained control instruction includes the lane changing, the coarse-grained control instruction may further include a lane changing direction. The control instruction decision model is obtained through pre-training. During training, the training driving status information and the training driving environment information are used as input in the control instruction decision model.

103. Determine, based on second driving environment information, whether the coarse-grained control instruction is to be executed.

The second driving environment information includes driving environment information corresponding to the coarse-grained control instruction when the self-driving vehicle is in the self-driving status. In this step, it is determined, mainly with reference to a security factor during driving of the self-driving vehicle, whether the coarse-grained control instruction calculated in step 102 can be executed, to prevent the self-driving vehicle from executing a calculated faulty coarse-grained control instruction or an unnecessary coarse-grained control instruction in step 102.

The driving manner of the self-driving vehicle is determined after the coarse-grained control instruction is calculated in step 102. Therefore, in this step, whether the coarse-grained control instruction is to be executed is determined based on only driving environment information that has impact on execution of the coarse-grained control instruction. Therefore, in this step, it is determined, based on the driving environment information corresponding to the coarse-grained control instruction, whether the coarse-grained control instruction is to be executed.

When the coarse-grained control instruction includes the straight driving, the driving environment information corresponding to the coarse-grained control instruction may include information about a front driving environment within a preset range of the self-driving vehicle; and when the coarse-grained control instruction includes the lane changing direction, the driving environment information corresponding to the coarse-grained control instruction may include information about a driving environment within a preset range on one side of the lane changing direction of the self-driving vehicle.

In this embodiment of the disclosure, the second driving environment information may include at least one of lane information that corresponds to the coarse-grained control instruction and that is of the lane in which the self-driving vehicle drives, information that corresponds to the coarse-grained control instruction and that is about a vehicle within the preset distance of the self-driving vehicle, and information that corresponds to the coarse-grained control instruction and that is about a road within the preset distance of the self-driving vehicle. The lane information may include a maximum speed limit of the lane, a width of the lane, and the like. The information about the vehicle may include a quantity of vehicles, a vehicle driving direction, a distance between the vehicle and the self-driving vehicle, and the like. The information about the road may include information about an isolation facility on the road, information about an obstacle on the road, and the like.

It should be noted that in this step, the second driving environment information may be obtained in real time, or may be determined from the first driving environment information obtained in step 101.

104. When the coarse-grained control instruction is to be executed, determine, based on lane information and the driving status information of the self-driving vehicle, a fine-grained control instruction corresponding to the coarse-grained control instruction.

The fine-grained control instruction may be a driving parameter used to control the self-driving vehicle, and may include a steering wheel rotation angle, a value of a throttle, a brake force, and the like. The lane information may include information about a lane that corresponds to a coarse-grained control instruction and that is on a road on which the self-driving vehicle drives. The road on which the self-driving vehicle drives includes a lane in which the self-driving vehicle drives and a lane to which the lane in which the self-driving vehicle drives may be changed. The lane that corresponds to the coarse-grained control instruction and that is on the road on which the self-driving vehicle drives may be a lane on which the self-driving vehicle needs to drive when executing the coarse-grained control instruction. For example, when the coarse-grained control instruction includes the straight driving, the lane that corresponds to the coarse-grained control instruction and that is on the road on which the self-driving vehicle drives may be a lane in which the self-driving vehicle drives straight; and when the coarse-grained control instruction includes the lane changing direction, the lane that corresponds to the coarse-grained control instruction and that is on the road on which the self-driving vehicle drives may be a lane in which the self-driving vehicle drives when changing a lane.

It should be noted that, in this step, the lane information and the driving status information of the self-driving vehicle may be obtained in real time, or may be determined from the driving status information and the first driving environment information obtained in step 101.

105. Output the fine-grained control instruction.

In this step, the fine-grained control instruction determined in step 104 is output, to control a corresponding component of the self-driving vehicle such that self-driving of the vehicle can be implemented.

In this embodiment of the disclosure, the coarse-grained control instruction is first calculated using the driving status information, the first driving environment information, and the control instruction decision model, and then it is determined, based on the second driving environment information, whether the coarse-grained control instruction can be executed. In other words, before a driving parameter for controlling the self-driving vehicle is determined, the coarse-grained control instruction is first calculated to calculate the driving manner of the self-driving vehicle. When the coarse-grained control instruction can be executed, the coarse-grained control instruction is converted into the fine-grained control instruction, to avoid outputting an unnecessary control instruction or a faulty control instruction when the vehicle performs automatic control, thereby preventing the self-driving vehicle from conducting unnatural driving behavior or having a security accident. In addition, in this embodiment of the disclosure, after the coarse-grained control instruction can be executed, the coarse-grained control instruction is converted into the fine-grained control instruction based on the driving status information of the self-driving vehicle and the lane information corresponding to the coarse-grained control instruction. In other words, a status of the self-driving vehicle during driving and lane information are fully considered to determine a fine-grained control instruction suitable for controlling the self-driving vehicle, thereby improving accuracy of the fine-grained control instruction and precision for controlling the self-driving vehicle, preventing the self-driving vehicle from conducting the unnatural driving behavior or having the security accident, reducing a security risk of the self-driving vehicle, and further improving security and comfort of the self-driving vehicle.

Figure 2:
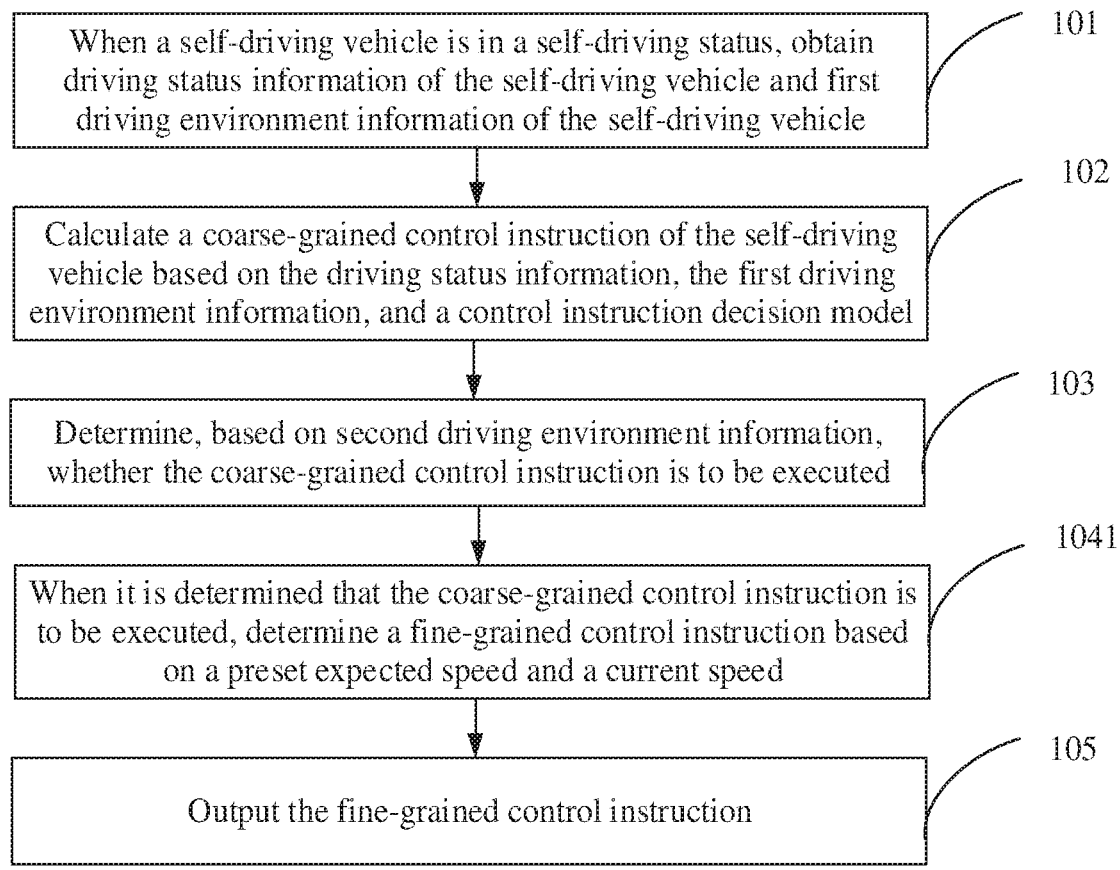
FIG. 2 is a schematic flowchart of a method for determining a fine-grained control instruction according to an embodiment of the disclosure.

FIG. 2 is a schematic flowchart of a method for determining a fine-grained control instruction according to an embodiment of the disclosure.

In an implementation of this embodiment of the disclosure, the coarse-grained control instruction calculated in step 102 may include straight driving. In this case, the lane information in step 104 includes a preset expected speed of a lane in which the self-driving vehicle drives straight, and the driving status information of the self-driving vehicle includes a current speed of the self-driving vehicle. When the coarse-grained control instruction is to be executed, as shown in FIG. 2, step 104 may be performed as step 1041.

1041. Determine the fine-grained control instruction based on a preset expected speed and a current speed.

Because the coarse-grained control instruction is the straight driving, a steering wheel rotation angle of the self-driving vehicle does not need to be controlled, and the steering wheel may remain a current state without being adjusted. In this case, a driving speed of the self-driving vehicle may be controlled.

In this embodiment of the disclosure, a corresponding expected speed may be preset for a different driving lane when the self-driving vehicle drives. To meet a vehicle driving rule and ensure driving security, the preset expected speed cannot be greater than a maximum speed limit of the lane. In this step, the speed of the self-driving vehicle is controlled based on the current speed of the self-driving vehicle and the preset expected speed of the lane in which the self-driving vehicle drives straight, and in other words, the fine-grained control instruction is calculated such that the self-driving vehicle can securely drive.

A vehicle driving speed is usually controlled by controlling a throttle or a brake of the vehicle.

In this embodiment of the disclosure, the fine-grained control instruction may include a value of a throttle of the self-driving vehicle.

When the value of the throttle is being determined, a difference between the current speed of the self-driving vehicle and the preset expected speed of the lane in which the self-driving vehicle drives straight needs to be first determined. When the current speed is greater than the preset expected speed, it indicates that the driving speed of the self-driving vehicle is excessively high. Therefore, in this case, the throttle may be set to be in a minimum state, and the value of the throttle is determined as zero such that the driving speed of the self-driving vehicle is reduced as soon as possible. When the current speed is not greater than the preset expected speed, it indicates that the driving speed of the self-driving vehicle is normal. In this case, the value of the throttle is determined based on a preset throttle control coefficient and a difference between the preset expected speed and the current speed, to accurately control the throttle, thereby ensuring driving security of the self-driving vehicle. When the current speed is not greater than the preset expected speed, the value of the throttle of the self-driving vehicle may be calculated based on a first preset formula. The first preset formula is expressed as a formula 1. Value of a throttle=Preset throttle control coefficient×(Preset expected speed−Current speed+Preset value) (1)

In the formula 1, the preset expected speed represents the preset expected speed of the lane in which the self-driving vehicle drives straight. When the preset expected speed of the lane in which the self-driving vehicle drives straight is a maximum speed limit of the lane in which the self-driving vehicle drives straight, the preset expected speed in the formula 1 may be replaced with a value of the maximum speed limit. In the formula 1, the current speed represents the current speed of the self-driving vehicle.

It should be noted that, the value of the throttle of the self-driving vehicle may be calculated according to the foregoing formula 1. Generally, when the value of the throttle is set to 1, it indicates that the throttle is in a maximum state, or when the value of the throttle is 0, it indicates that the throttle is in a minimum state. Therefore, a range of the value of the throttle may be greater than or equal to 0 and less than or equal to 1. A preset value may be set based on an actual application scenario and specific performance of the vehicle. Generally, the preset value may be equal to 1.

In this embodiment of the disclosure, the fine-grained control instruction may include a brake force of the self-driving vehicle.

When the brake force is being determined, a difference between a current speed of the self-driving vehicle and a preset expected speed of a lane in which the self-driving vehicle drives straight needs to be first determined. When the current speed is less than the preset expected speed, it indicates that the driving speed of the self-driving vehicle is normal. In this case, the self-driving vehicle may not brake. Therefore, the brake may be set to be in a minimum state, and in other words, the brake force is determined as zero. When the current speed is not less than the preset expected speed, it indicates that the driving speed of the self-driving vehicle is excessively high. In this case, the speed of the self-driving vehicle needs to be reduced using the brake. Therefore, the brake force is determined based on a preset brake control coefficient and a difference between the preset expected speed and the current speed, to accurately control the brake, and ensure driving security of the self-driving vehicle. When the current speed is not less than the preset expected speed, the brake force of the self-driving vehicle may be calculated based on a second preset formula. The second preset formula is expressed as a formula 2. Brake force=Preset brake control coefficient×(Current speed−Preset expected speed) (2)

In the formula 2, the preset expected speed represents the preset expected speed of the lane in which the self-driving vehicle drives straight. When the preset expected speed of the lane in which the self-driving vehicle drives straight is a maximum speed limit of the lane in which the self-driving vehicle drives straight, the preset expected speed in the formula 2 may be replaced with a value of the maximum speed limit. In the formula 2, the current speed represents the current speed of the self-driving vehicle.

It should be noted that, the brake force of the self-driving vehicle may be calculated according to the foregoing formula 2. Generally, when the brake force is set to 1, it indicates a maximum state of the brake force, and when the brake force is 0, it indicates a minimum state of the brake force. Therefore, a value range of the brake force may be greater than or equal to 0 and less than or equal to 1.

It should be noted that the preset throttle control coefficient in the formula 1 and the preset brake control coefficient in the formula 2 may be determined based on performance of the self-driving vehicle. A vehicle of a different brand and model may be corresponding to a different preset throttle control coefficient and preset brake control coefficient. For example, the preset brake control coefficient may be 0.1, and the preset throttle control coefficient may be 0.2.

In this embodiment of the disclosure, when the coarse-grained control instruction includes the straight driving, it is possible that only the driving speed of the self-driving vehicle is controlled without a need to control the steering wheel rotation angle of the self-driving vehicle. Therefore, the fine-grained control instruction is determined for the self-driving vehicle based on the current speed of the self-driving vehicle and the preset expected speed of the lane in which the self-driving vehicle drives straight, to improve accuracy of the fine-grained control instruction and precision for controlling the self-driving vehicle, and prevent the self-driving vehicle from conducting unnatural driving behavior such as a side-to-side swing.

Figure 3:
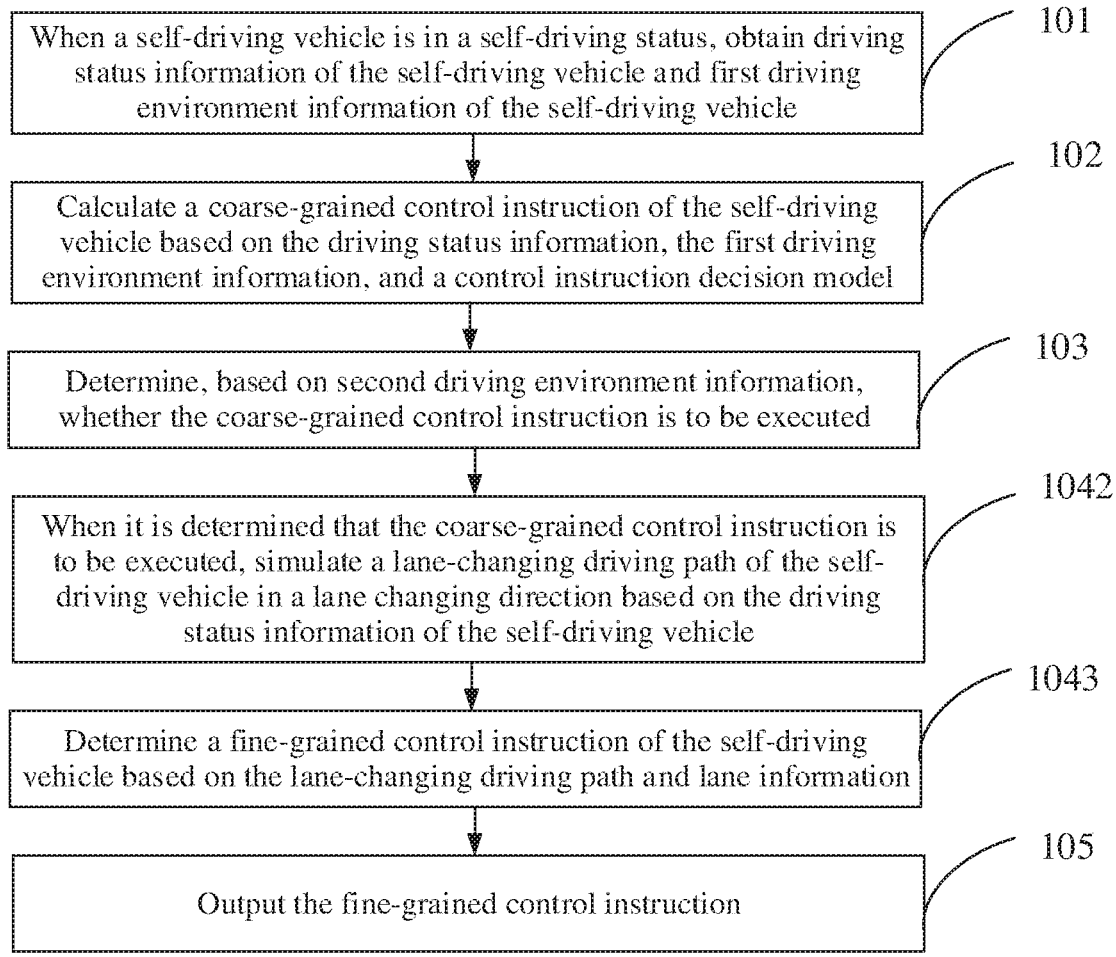
FIG. 3 is a schematic flowchart of another method for determining a fine-grained control instruction according to an embodiment of the disclosure.

FIG. 3 is a schematic flowchart of another method for determining a fine-grained control instruction according to an embodiment of the disclosure.

In another implementation of this embodiment of the disclosure, the coarse-grained control instruction calculated in step 102 may include a lane changing direction. In this case, when the coarse-grained control instruction is to be executed, as shown in FIG. 3, step 104 may be performed as step 1042 and step 1043.

1042. Simulate a lane-changing driving path of a self-driving vehicle in a lane changing direction based on driving status information of the self-driving vehicle.

An implementation for simulating the lane-changing driving path is not limited.

1043. Determine a fine-grained control instruction of the self-driving vehicle based on the lane-changing driving path and the lane information.

In this embodiment of the disclosure, when the coarse-grained control instruction includes the lane changing direction, it indicates that the self-driving vehicle needs to change a lane on a side corresponding to the lane changing direction. In this case, the lane-changing driving path of the self-driving vehicle is first simulated, in other words, before the self-driving vehicle actually changes the lane, a lane changing path is first determined, and then a fine-grained control instruction of the self-driving vehicle during lane changing is determined based on the predetermined lane changing path and lane information, to improve accuracy of the fine-grained control instruction and precision for controlling the self-driving vehicle, thereby improving security of the self-driving vehicle during the lane changing.

In this embodiment of the disclosure, the fine-grained control instruction may include the steering wheel rotation angle of the self-driving vehicle. In this case, the lane information in step 1043 includes a lane width of a lane corresponding to the lane-changing driving path and a lane middle line of the lane corresponding to the lane-changing driving path. Step 1043 may be performed as operations determining, in the lane-changing driving path, at least one steering angle between a driving direction of the self-driving vehicle and a straight driving direction of a lane in which the self-driving vehicle is currently located; determining, in the lane-changing driving path based on the lane width of the lane corresponding to the lane-changing driving path, a target lane width of a lane to which the self-driving vehicle at a position corresponding to the steering angle belongs; determining, in the lane-changing driving path based on the lane middle line of the lane corresponding to the lane-changing driving path, a target distance between the self-driving vehicle at the position corresponding to the steering angle and a lane middle line of the lane to which the self-driving vehicle belongs; and calculating the steering wheel rotation angle based on a third preset formula, the steering angle, the target lane width, and the target distance. The third preset formula is expressed as a formula 3.

The simulated lane-changing driving path is a curved lane-changing driving path for the self-driving vehicle. In this embodiment of the disclosure, to facilitate controlling of the self-driving vehicle, a continuous driving process of the self-driving vehicle in the lane-changing driving path may be divided using at least one time point, and fine-grained control instructions of the self-driving vehicle at these time points are calculated, to control an entire lane-changing driving process of the self-driving vehicle in this manner. Therefore, at least one position of the self-driving vehicle in the lane-changing driving path may be determined for the time point at which the lane-changing driving path is divided, and further, at least one steering angle between a driving direction of the self-driving vehicle during lane-changing driving and a straight driving direction of a lane in which the self-driving vehicle is currently located may be simulated. In other words, at least one steering angle between the driving direction of the self-driving vehicle in the lane-changing driving path and the straight driving direction of the lane in which the self-driving vehicle is currently located is determined.

After steering angles are determined, these steering angles need to be converted into steering wheel rotation angles of the self-driving vehicle. For each of the at least one steering angle, a position corresponding to the steering angle in the lane-changing driving path may be determined, namely, a position that corresponds to the steering angle and that is of the self-driving vehicle in the lane-changing driving path, to determine a lane to which the self-driving vehicle at the position in the lane-changing driving path belongs, and a target lane width of the lane to which the self-driving vehicle at the position in the lane-changing driving path belongs. Likewise, for each of the at least one steering angle, a target distance between the lane middle line of the lane to which the self-driving vehicle at the position corresponding to the steering angle in the lane-changing driving path belongs and the self-driving vehicle at the position corresponding to the steering angle in the lane-changing driving path may be determined based on the lane middle line of the lane corresponding to the lane-changing driving path. After the corresponding target lane width and target distance are determined for each of the at least one steering angle, the steering wheel rotation angle corresponding to the steering angle may be calculated according to a formula 3. Steering wheel rotation angle=[Steering angle−Target distance/(Target lane width×First steering angle coefficient)]×Second steering angle coefficient (3)

In the formula 3, the steering angle represents an angle between a driving direction of the self-driving vehicle and a straight driving direction of the self-driving vehicle, and the target distance represents a distance between the self-driving vehicle at the position corresponding to the steering angle in the lane-changing driving path and the lane middle line of the lane to which the self-driving vehicle at the position corresponding to the steering angle in the lane-changing driving path belongs. The target lane width represents a target lane width of the lane to which the self-driving vehicle at the position corresponding to the steering angle in the lane-changing driving path belongs.

It should be noted that, in the formula 3, the first steering angle coefficient and the second steering angle coefficient may be determined based on performance of the self-driving vehicle. A vehicle of a different brand and model may be corresponding to a different first steering angle coefficient and second steering angle coefficient. For example, a value of the first steering angle coefficient may be 0.541, and a value of the second steering angle coefficient may be 0.4. In this embodiment of the disclosure, a value of a steering wheel rotation angle generated when the steering wheel is rotated to a maximum angle on one side may be set to −1, and a value of the steering wheel rotation angle generated when the steering wheel is rotated to a maximum angle on the other side is set to 1. Therefore, a range of the steering wheel rotation angle may be greater than or equal to −1 and less than or equal to 1.

In this embodiment of the disclosure, the steering wheel rotation angle of the self-driving vehicle needs to be controlled because the lane-changing driving path of the self-driving vehicle is a curve. Therefore, a required steering position and steering angle of the self-driving vehicle during lane changing may be determined based on the pre-simulated lane-changing driving path, and then a rotation angle of the steering wheel at each corresponding steering angle is determined with reference to information about a lane corresponding to each steering angle in the lane-changing driving path, and in other words, an angle by which the steering wheel of the self-driving vehicle needs to be rotated during the lane changing is determined, thereby accurately controlling the steering wheel and ensuring driving security of the self-driving vehicle.

In this embodiment of the disclosure, after the steering wheel rotation angle of the self-driving vehicle in a lane changing process is determined, a driving speed of the self-driving vehicle may be further controlled. In a process of performing the foregoing step 1043, to facilitate controlling of the self-driving vehicle, a continuous driving process of the self-driving vehicle in the lane-changing driving path is divided using at least one time point, and at least one steering angle is determined. In this embodiment of the disclosure, the driving speed of the self-driving vehicle may be controlled by determining a speed of the self-driving vehicle at each of the at least one steering angle in the lane-changing driving path.

The fine-grained control instruction further includes a value of a throttle of the self-driving vehicle. In this case, the lane information in step 104 may further include a preset expected speed of a lane corresponding to the lane-changing driving path.

In a process of performing the foregoing step 1043, after the at least one steering angle is determined, the following process may be further performed. In the lane-changing driving path, a current speed of the self-driving vehicle at a position corresponding to the steering angle is determined based on the driving status information of the self-driving vehicle; in the lane-changing driving path, a target preset expected speed of the lane to which the self-driving vehicle at the position corresponding to the steering angle belongs is determined based on the preset expected speed of the lane corresponding to the lane-changing driving path; and when the current speed is greater than the target preset expected speed, determining that the value of the throttle is equal to zero; or when the current speed is not greater than the target preset expected speed, the value of the throttle of the self-driving vehicle at the position corresponding to the steering angle is calculated based on a fourth preset formula.

In this embodiment of the disclosure, a value of a corresponding throttle may be determined for each of the at least one steering angle. First, the current speed of the self-driving vehicle at the position corresponding to the steering angle and the target preset expected speed of the lane to which the self-driving vehicle at the position corresponding to the steering angle belongs are determined in the lane-changing driving path, and the value of the throttle may be determined by performing calculation according to a formula 4. Value of a throttle=Preset throttle control coefficient×(Target preset expected speed−Current speed+Preset value) (4)

The target preset expected speed in the formula 4 represents the target preset expected speed of the lane to which the self-driving vehicle at the position corresponding to the steering angle in the lane-changing driving path belongs. When the target preset expected speed is a maximum speed limit of the lane to which the self-driving vehicle at the position corresponding to the steering angle in the lane-changing driving path belongs, the target preset expected speed in the formula 4 may be replaced with a value of the maximum speed limit. In the formula 4, the current speed represents the current speed of the self-driving vehicle at the position corresponding to the steering angle in the lane-changing driving path.

In this embodiment of the disclosure, when the self-driving vehicle changes a lane, the driving speed may be further controlled. When the current speed is greater than the target preset expected speed, the value of the throttle is determined as zero, to reduce the driving speed of the self-driving vehicle as soon as possible; or when the current speed is not greater than the target preset expected speed, the value of the throttle is determined based on the preset throttle control coefficient and a difference between the target preset expected speed and the current speed, to accurately control the throttle and ensure driving security of the self-driving vehicle.

The fine-grained control instruction may further include a brake force of the self-driving vehicle. In this case, the lane information in step 104 may further include a preset expected speed of a lane corresponding to the lane-changing driving path.

In a process of performing the foregoing step 1043, after the at least one steering angle is determined, the following process may be further performed. In the lane-changing driving path, a current speed of the self-driving vehicle at a position corresponding to the steering angle is determined based on the driving status information of the self-driving vehicle; in the lane-changing driving path, the target preset expected speed of the lane to which the self-driving vehicle at the position corresponding to the steering angle belongs is determined based on the preset expected speed of the lane corresponding to the lane-changing driving path; and when the current speed is less than the target preset expected speed, determining that the brake force is equal to zero; or when the current speed is not less than the target preset expected speed, the brake force of the self-driving vehicle at the position corresponding to the steering angle is calculated based on a fifth preset formula.

In this embodiment of the disclosure, a corresponding brake force may be determined for each of the at least one steering angle. First, the current speed of the self-driving vehicle at the position corresponding to the steering angle and the target preset expected speed of the lane to which the self-driving vehicle at the position corresponding to the steering angle belongs are determined in the lane-changing driving path, and the brake force may be determined by performing calculation according to a formula 5. Brake force=Preset brake control coefficient×(Current speed−Target preset expected speed) (5)

The target preset expected speed in the formula 5 represents the target preset expected speed of the lane to which the self-driving vehicle at the position corresponding to the steering angle in the lane-changing driving path belongs. When the target preset expected speed is a maximum speed limit of the lane to which the self-driving vehicle at the position corresponding to the steering angle in the lane-changing driving path belongs, the target preset expected speed in the formula 5 may be replaced with a value of the maximum speed limit. In the formula 5, the current speed represents the current speed of the self-driving vehicle at the position corresponding to the steering angle in the lane-changing driving path.

In this embodiment of the disclosure, when the self-driving vehicle changes a lane, the driving speed may be further controlled. When the current speed is less than the target preset expected speed, the self-driving vehicle may not be braked, and therefore, the brake force is adjusted to zero; or when the current speed is not less than the target preset expected speed, the speed of the self-driving vehicle needs to be controlled using the brake. Therefore, the brake force is determined based on the preset brake control coefficient and a difference between the target preset expected speed and the current speed, to accurately control the brake and ensure driving security of the self-driving vehicle.

It should be noted that setting manners of the value of the throttle, the preset throttle control coefficient, and the preset value in the formula 4 are the same as setting manners of the value of the throttle, the preset throttle control coefficient, and the preset value in the formula 1. Setting manners of the brake force and the preset brake control coefficient in the formula 5 are the same as setting manners of the brake force and the preset brake control coefficient in the formula 2.

In still another optional implementation of this embodiment of the disclosure, second driving environment information may include a first vehicle distance between a target vehicle and the self-driving vehicle, and the target vehicle represents a vehicle that corresponds to the coarse-grained control instruction and that is within a preset distance of the self-driving vehicle. In this case, step 103 may be performed as operations, when the first vehicle distance is greater than a secure distance, determining that the coarse-grained control instruction is to be executed; or when the first vehicle distance is not greater than the secure distance, determining that the coarse-grained control instruction is not to be executed.

When the coarse-grained control instruction includes straight driving, the target vehicle represents a front vehicle within a preset distance of the self-driving vehicle; and when the coarse-grained control instruction includes a lane changing direction, the target vehicle represents a vehicle within a preset distance on one side of the lane changing direction of the self-driving vehicle. If there is no vehicle that corresponds to the coarse-grained control instruction and that is within the preset distance of the self-driving vehicle, and in other words, no vehicle corresponding to the coarse-grained control instruction exists within the preset distance of the self-driving vehicle, the first vehicle distance may be determined as infinity.

It should be noted that when the first vehicle distance is less than or equal to a preset secure distance, it may be determined that the coarse-grained control instruction is not to be executed. In this case, the self-driving vehicle may abandon the coarse-grained control instruction to maintain a current driving status. When the coarse-grained control instruction includes straight driving, if the coarse-grained control instruction is not to be executed, the processing process in step 1041 in this embodiment of the disclosure may be also executed, to control a driving speed of the self-driving vehicle in real time. In this embodiment of the disclosure, it may be further determined, using other information, whether the coarse-grained control instruction is to be executed. This is not limited in this embodiment of the disclosure.

In this embodiment of the disclosure, the secure distance may be a distance meeting a requirement that the self-driving vehicle does not come into contact with the target vehicle within a preset time period while the self-driving vehicle drives at a current speed of the self-driving vehicle and the target vehicle drives at a current speed of the target vehicle. In other words, in the secure distance, it needs to be ensured that the self-driving vehicle does not collide with the target vehicle in a driving process in which the self-driving vehicle drives at the current speed of the self-driving vehicle for the preset time period and the target vehicle simultaneously drives at the current speed of the target vehicle for the same preset time period.

In this embodiment of the disclosure, after the coarse-grained control instruction is calculated, in consideration of security, whether the coarse-grained control instruction is to be executed may be determined by determining whether the vehicle that corresponds to the coarse-grained control instruction and that is within the preset distance of the self-driving vehicle affects security of the self-driving vehicle, namely, by determining whether the first vehicle distance between the target vehicle and the self-driving vehicle reaches the secure distance. The first vehicle distance is compared with the secure distance, and the coarse-grained control instruction is not to be executed when the first vehicle distance does not reach the secure distance, and the coarse-grained control instruction is to be executed only when the first vehicle distance reaches the secure distance, thereby effectively improving security of the self-driving vehicle during self-driving and avoiding a security accident caused because the self-driving vehicle executes a faulty control instruction or an unnecessary control instruction.

In yet another optional implementation of this embodiment of the disclosure, when the coarse-grained control instruction includes the lane changing direction, before step 103, step 106 may be further performed. Step 106: Simulate a lane-changing driving path of the self-driving vehicle in the lane changing direction based on the driving status information of the self-driving vehicle. In this case, the second driving environment information includes a second vehicle distance between the target vehicle and the self-driving vehicle when the self-driving vehicle is driving on the lane-changing driving path, and the target vehicle represents a vehicle that correspondscorresponds to the coarse-grained control instruction and that is within the preset distance of the self-driving vehicle. Step 103 may be performed as operations, when the second vehicle distance is greater than the secure distance, determining that the coarse-grained control instruction is to be executed; or when the second vehicle distance is not greater than the secure distance, determining that the coarse-grained control instruction is not to be executed.

When the coarse-grained control instruction includes the lane changing direction, the target vehicle represents a vehicle within a preset distance on one side of the lane changing direction of the self-driving vehicle. If there is no vehicle that corresponds to the coarse-grained control instruction and that is within the preset distance of the self-driving vehicle, and in other words, no vehicle corresponding to the coarse-grained control instruction exists within the preset distance of the self-driving vehicle, the second vehicle distance may be determined as infinity.

It should be noted that when the second vehicle distance is less than or equal to a preset secure distance, it may be determined that the coarse-grained control instruction is not to be executed. In this case, the self-driving vehicle may abandon the coarse-grained control instruction to maintain a current driving status. In this embodiment of the disclosure, it may be further determined, using other information, whether the coarse-grained control instruction is to be executed. This is not limited in this embodiment of the disclosure.

In this embodiment of the disclosure, the secure distance may be a distance meeting a requirement that the self-driving vehicle does not come into contact with the target vehicle within a preset time period while the self-driving vehicle drives at a current speed of the self-driving vehicle and the target vehicle drives at a current speed of the target vehicle. In other words, in the secure distance, it needs to be ensured that the self-driving vehicle does not collide with the target vehicle in a driving process in which the self-driving vehicle drives at the current speed of the self-driving vehicle for the preset time period and the target vehicle simultaneously drives at the current speed of the target vehicle for the same preset time period.

In this embodiment of the disclosure, when the coarse-grained control instruction includes the lane changing direction, the lane-changing driving path of the self-driving vehicle may be first simulated, and then it is determined, based on the second vehicle distance between the target vehicle and the self-driving vehicle when the self-driving vehicle is driving on the lane-changing driving path, whether the coarse-grained control instruction is to be executed, thereby improving accuracy of determining and security of the self-driving vehicle during self-driving.

In still yet another optional implementation of this embodiment of the disclosure, before step 102 is performed, this embodiment of the disclosure further includes a process of training a control instruction decision model. The process may include the following steps.

Step A. Initialize a model parameter of a control instruction decision model.

When training of the control instruction decision model is started, the model parameter of the control instruction decision model needs to be initialized. An initialization manner may be random generation.

Step B. Obtain a training parameter.

The training parameter includes training driving status information and training driving environment information, namely, training driving status information of the self-driving vehicle in a training status and training driving environment information of the self-driving vehicle in the training status. Content included in the training driving status information may be the same as that included in the driving status information in step 101. A difference is that the training driving status information is obtained when the self-driving vehicle is in the training status, and the driving status information is obtained when the self-driving vehicle is in a self-driving status. Content included in the training driving environment information may be the same as that included in the driving environment information in step 101. A difference is that the training driving environment information is obtained when the self-driving vehicle is in the training status, and the driving environment information is obtained when the self-driving vehicle is in the self-driving status.

Step C. Calculate a coarse-grained training control instruction of the self-driving vehicle based on the model parameter and the training parameter.

In this case, the model parameter needs to be continuously updated in a training process until a precision requirement or an accuracy requirement of the control instruction decision model is met. An update manner of the model parameter is determined by calculating whether the coarse-grained training control instruction meets the requirement.

Step D. Calculate a value of a loss function based on the coarse-grained training control instruction.

A loss function Loss1 may be expressed as a formula 6. $Loss1=|v \cos \alpha - v \sin \alpha - Q|^2$ (6), where v represents a current speed of the self-driving vehicle, $\alpha$ represents an angle between a current driving direction of the self-driving vehicle and a lane in which the self-driving vehicle is located, and Q represents a matching degree between the coarse-grained training control instruction and a preset coarse-grained training control instruction corresponding to the training parameter.

It should be noted that v represents the driving speed of the self-driving vehicle in the training status.

Step E. Update the model parameter when the value of the loss function does not meet a preset condition.

In this embodiment of the disclosure, the calculated value of the loss function is compared with the preset condition to determine whether the model parameter in the control instruction decision model meets a requirement, namely, whether training of the control instruction decision model is completed. When the value of the loss function does not meet the preset condition, it indicates that the model parameter does not meet the requirement. Therefore, the model parameter needs to be updated, and the control instruction decision model continues to be trained.

It should be noted that the preset condition may be determined based on the requirement for the model parameter or a standard that needs to be met by the control instruction decision model. In this embodiment of the disclosure, the preset condition may indicate that a quantity of times for which values of loss functions continuously fall within a preset range reaches a preset threshold.

Step F. Calculate an updated coarse-grained training control instruction of the self-driving vehicle based on an updated model parameter and the training parameter, and recalculate the value of the loss function until the value of the loss function meets the preset condition.

After the model parameter is updated, step C may be re-performed based on the updated model parameter, to obtain the updated coarse-grained training control instruction, and further, step D is performed to calculate a new value of the loss function, and then the new value of the loss function is compared with the preset condition. When the new value of the loss function does not meet the preset condition, step E and step F are performed. In other words, steps are cyclically performed in this way until the calculated value of the loss function in step D meets the preset condition.

Step G. Determine a model parameter corresponding to the value of the loss function that meets the preset condition as a final model parameter of the control instruction decision model.

When that the calculated value of the loss function has met the preset condition, it indicates that the model parameter can meet the requirement, and the training of the control instruction decision model is completed. In this case, the model parameter corresponding to the value of the loss function that meets the preset condition is a model parameter obtained after the training of the control instruction decision model is completed.

It should be noted that the control instruction decision model may be a neural network model, and an algorithm for training the control instruction decision model may be an actor-critic reinforcement learning algorithm. A driving policy decision model is an actor network, and a value of Q is calculated using a critic network. The critic network may be also the neural network model, input is the training parameter obtained in step B and the coarse-grained training control instruction calculated in step C, and output is the value of Q. A parameter of the critic network is initialized in step A, and the parameter of the critic network is updated each time the model parameter has been updated in step E. An update manner is not limited, and may be implemented using a backpropagation algorithm.

In an optional implementation of this embodiment of the disclosure, before the model parameter is updated in step E, an updating gradient of the model parameter needs to be further calculated. In this case, after the updating gradient is calculated, an updated model parameter may be calculated based on the updating gradient, a preset updating coefficient, and the model parameter on which updating is to be performed.

The updated model parameter may be calculated according to a formula 7.

$$\theta = \theta 1 = \beta \frac{\partial Loss}{\partial \theta}, \quad (7)$$

where θ represents an updated model parameter, θ1 represents a model parameter on which updating is to be performed, β represents a preset updating coefficient, and $$\frac{\partial Loss}{\partial \theta}$$

and represents an updating gradient.

In the foregoing process of calculating the updating gradient of the model parameter, before the updating gradient of the model parameter is calculated, it may be further determined whether the self-driving vehicle executes the coarse-grained training control instruction. In this case, the process of calculating the updating gradient of the model parameter may be performed as the following process. When the coarse-grained training control instruction is to be executed, the updating gradient is calculated using a first preset relationship; or when the coarse-grained training control instruction is not to be executed, the updating gradient is calculated using a second preset relationship.

The first preset relationship may indicate that the updating gradient is equal to a partial derivative value of a first loss function with respective to the model parameter. In this case, the first loss function is expressed as the formula 6. The second preset relationship may indicate that the updating gradient is equal to a partial derivative value of a second loss function with respective to the model parameter, and the second loss function is expressed as a formula 8.

$$Loss2 = |-R-Q|^2 = |v \sin \alpha - v \cos \alpha - Q|^2 \quad (8).$$

Meanings of parameters in the formula 8 are the same as meanings of parameters in the formula 6. Details are not described herein again.

When the coarse-grained training control instruction is to be executed, in the formula 7, $$\frac{\partial Loss}{\partial \theta} = \frac{\partial Loss1}{\partial \theta};$$

or when the coarse-grained training control instruction is not to be executed, in the formula 7, $$\frac{\partial Loss}{\partial \theta} = \frac{\partial Loss2}{\partial \theta}.$$

Figure 4:
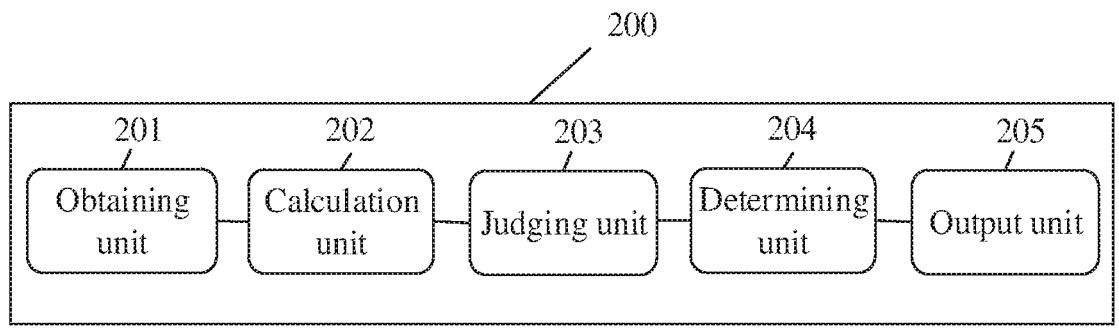
FIG. 4 is a schematic block diagram of a vehicle control apparatus according to an embodiment of the disclosure.

FIG. 4 is a schematic block diagram of a vehicle control apparatus 200 according to an embodiment of the disclosure. As shown in FIG. 4, the apparatus 200 includes an obtaining unit 201 configured to, when a self-driving vehicle is in a self-driving status, obtain driving status information of the self-driving vehicle and first driving environment information of the self-driving vehicle; a calculation unit 202 configured to calculate a coarse-grained control instruction of the self-driving vehicle based on the driving status information, the first driving environment information, and a control instruction decision model, where the coarse-grained control instruction is used to control a driving manner of the self-driving vehicle, and the control instruction decision model is obtained through training based on training driving status information of the self-driving vehicle in a training status and training driving environment information of the self-driving vehicle in the training status; a judging unit 203 configured to determine, based on second driving environment information, whether the coarse-grained control instruction is to be executed, where the second driving environment information includes driving environment information corresponding to the coarse-grained control instruction when the self-driving vehicle is in the self-driving status; a determining unit 204 configured to, when the coarse-grained control instruction is to be executed, determine, based on lane information and the driving status information of the self-driving vehicle, a fine-grained control instruction corresponding to the coarse-grained control instruction, where the fine-grained control instruction is used to control a driving parameter of the self-driving vehicle, and the lane information includes information about a lane that corresponds to the coarse-grained control instruction and that is on a road on which the self-driving vehicle drives; and an output unit 205 configured to output the fine-grained control instruction.

In this embodiment of the disclosure, the control apparatus 200 first calculates the coarse-grained control instruction using the driving status information, the first driving environment information, and the control instruction decision model, and then determines, based on the second driving environment information, whether the coarse-grained control instruction can be executed. In other words, before determining the driving parameter for controlling the self-driving vehicle, the control apparatus 200 first calculates the coarse-grained control instruction to calculate the driving manner of the self-driving vehicle. When determining that the coarse-grained control instruction can be executed, the control apparatus 200 further converts the coarse-grained control instruction into the fine-grained control instruction, to avoid outputting an unnecessary control instruction or a faulty control instruction when the vehicle performs automatic control, thereby preventing the self-driving vehicle from conducting unnatural driving behavior or having a security accident. In addition, in this embodiment of the disclosure, after determining that the coarse-grained control instruction can be executed, the control apparatus converts the coarse-grained control instruction into the fine-grained control instruction based on the driving status information of the self-driving vehicle and the lane information corresponding to the coarse-grained control instruction. In other words, a status of the self-driving vehicle during driving and lane information are fully considered to determine a fine-grained control instruction suitable for controlling the self-driving vehicle, thereby improving accuracy of the fine-grained control instruction and precision for controlling the self-driving vehicle, preventing the self-driving vehicle from conducting the unnatural driving behavior or having the security accident, reducing a security risk of the self-driving vehicle, and further improving security and comfort of the self-driving vehicle.

It may be understood that the coarse-grained control instruction includes straight driving; the lane information includes a preset expected speed of a lane in which the self-driving vehicle drives straight, and the driving status information of the self-driving vehicle includes a current speed of the self-driving vehicle; and the determining unit 204 is configured to determine the fine-grained control instruction based on the preset expected speed and the current speed.

It may be understood that the fine-grained control instruction includes a value of a throttle of the self-driving vehicle; the determining unit 204 is configured to, when the current speed is greater than the preset expected speed, determining that the value of the throttle is equal to zero; or when the current speed is not greater than the preset expected speed, calculate the value of the throttle of the self-driving vehicle based on a first preset formula, where the first preset formula includes Value of a throttle=Preset throttle control coefficient×(Preset expected speed−Current speed+Preset value).

It may be understood that the fine-grained control instruction includes a brake force of the self-driving vehicle; the determining unit 204 is configured to, when the current speed is less than the preset expected speed, determining that the brake force is equal to zero; or when the current speed is not less than the preset expected speed, calculate the brake force of the self-driving vehicle based on a second preset formula, where the second preset formula includes Brake force=Preset brake control coefficient×(Current speed−Preset expected speed).

It may be understood that the coarse-grained control instruction includes a lane changing direction; the determining unit 204 is configured to simulate a lane-changing driving path of the self-driving vehicle in the lane changing direction based on the driving status information of the self-driving vehicle; and determine the fine-grained control instruction of the self-driving vehicle based on the lane-changing driving path and the lane information.

It may be understood that the fine-grained control instruction includes a steering wheel rotation angle; the lane information includes a lane width of a lane corresponding to the lane-changing driving path and a lane middle line of the lane corresponding to the lane-changing driving path; and the determining unit 204 is configured to determine, in the lane-changing driving path, at least one steering angle between a driving direction of the self-driving vehicle and a straight driving direction of a lane in which the self-driving vehicle is currently located; determine, in the lane-changing driving path based on the lane width of the lane corresponding to the lane-changing driving path, a target lane width of a lane to which the self-driving vehicle at a position corresponding to the steering angle belongs; determine, in the lane-changing driving path based on the lane middle line of the lane corresponding to the lane-changing driving path, a target distance between the self-driving vehicle at the position corresponding to the steering angle and a lane middle line of the lane to which the self-driving vehicle belongs; and calculate the steering wheel rotation angle based on a third preset formula, the steering angle, the target lane width, and the target distance, where the third preset formula includes Steering wheel rotation angle=[Steering angle−Target distance/(Target lane width×First steering angle coefficient)]×Second steering angle coefficient.

It may be understood that the fine-grained control instruction further includes a value of a throttle of the self-driving vehicle; the lane information further includes a preset expected speed of the lane corresponding to the lane-changing driving path; and the determining unit 204 is configured to determine, in the lane-changing driving path based on the driving status information of the self-driving vehicle, a current speed of the self-driving vehicle in a lane to which the self-driving vehicle at the position corresponding to the steering angle belongs; determine, in the lane-changing driving path based on the preset expected speed of the lane corresponding to the lane-changing driving path, a target preset expected speed of the self-driving vehicle at the position corresponding to the steering angle; and when the current speed is greater than the target preset expected speed, determine that the value of the throttle is equal to zero; or when the current speed is not greater than the target preset expected speed, calculate, based on a fourth preset formula, the value of the throttle of the self-driving vehicle at the position corresponding to the steering angle, where the fourth preset formula includes Value of a throttle=Preset throttle control coefficient×(Target preset expected speed−Current speed+Preset value).

It may be understood that the fine-grained control instruction further includes a brake force of the self-driving vehicle; the lane information further includes a preset expected speed of a lane corresponding to the lane-changing driving path; and the determining unit 204 is configured to determine, in the lane-changing driving path based on the driving status information of the self-driving vehicle, a current speed of the self-driving vehicle at the position corresponding to the steering angle; determine, in the lane-changing driving path based on the preset expected speed of the lane corresponding to the lane-changing driving path, a target preset expected speed of the lane to which the self-driving vehicle at the position corresponding to the steering angle belongs; and when the current speed is less than the target preset expected speed, determine that the brake force is equal to zero; or when the current speed is not less than the target preset expected speed, calculate, based on a fifth preset formula, a brake force of the self-driving vehicle at the position corresponding to the steering angle, where the fifth preset formula includes Brake force=Preset brake control coefficient×(Current speed−Target preset expected speed).

It may be understood that the first driving environment information includes at least one of lane information of a lane in which the self-driving vehicle drives, information about a vehicle within a preset distance of the self-driving vehicle, and information about a road within the preset distance of the self-driving vehicle; and the second driving environment information includes at least one of lane information that corresponds to the coarse-grained control instruction and that is of the lane in which the self-driving vehicle drives, information that corresponds to the coarse-grained control instruction and that is about vehicle within the preset distance of the self-driving vehicle, and information that corresponds to the coarse-grained control instruction and that is about road within the preset distance of the self-driving vehicle.

It may be understood that the second driving environment information includes a first vehicle distance between a target vehicle and the self-driving vehicle, and the target vehicle represents a vehicle that corresponds to the coarse-grained control instruction and that is within the preset distance of the self-driving vehicle; and the judging unit 203 is configured to, when the first vehicle distance is greater than a secure distance, determine that the coarse-grained control instruction is to be executed; or when the first vehicle distance is not greater than a secure distance, determine that the coarse-grained control instruction is not to be executed.

Figure 5:
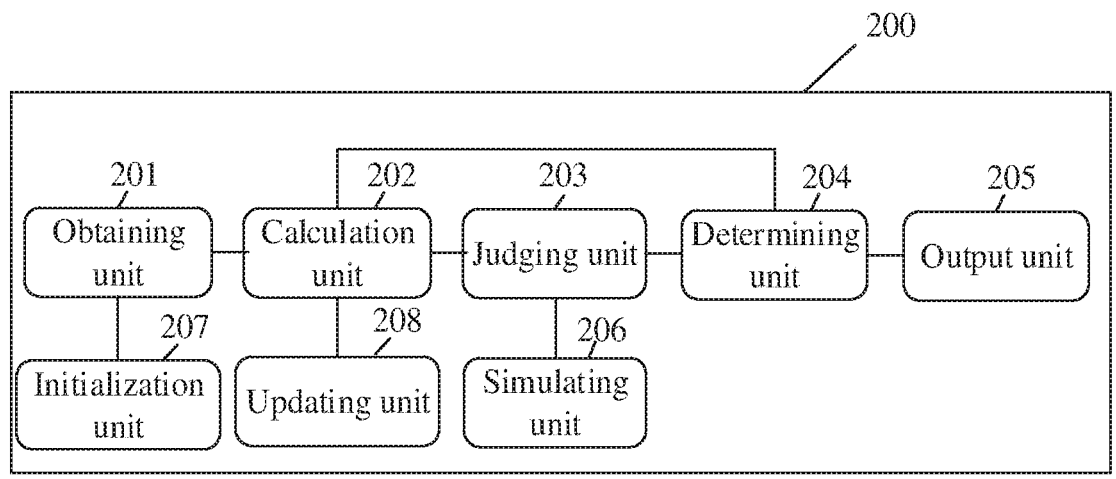
FIG. 5 is a schematic block diagram of a vehicle control apparatus according to another embodiment of the disclosure.

FIG. 5 is a schematic block diagram of a vehicle control apparatus 200 according to another embodiment of the disclosure.

It may be understood that the coarse-grained control instruction includes a lane changing direction.

As shown in FIG. 5, the control apparatus 200 may further include a simulating unit 206 configured to simulate a lane-changing driving path of the self-driving vehicle in the lane changing direction based on the driving status information of the self-driving vehicle, where the second driving environment information includes a second vehicle distance between a target vehicle and the self-driving vehicle when the self-driving vehicle is driving on the lane-changing driving path, and the target vehicle represents a vehicle that corresponds to the coarse-grained control instruction and that is within the preset distance of the self-driving vehicle; and the judging unit 203 is configured to, when the second vehicle distance is greater than a secure distance, determine that the coarse-grained control instruction is to be executed; or when the second vehicle distance is not greater than a secure distance, determine that the coarse-grained control instruction is not to be executed.

It may be understood that, as shown in FIG. 5, the control apparatus 200 may further include an initialization unit 207 configured to initialize a model parameter of the control instruction decision model, where the obtaining unit 201 is further configured to obtain a training parameter, where the training parameter includes the training driving status information and the training driving environment information; the calculation unit 202 is further configured to calculate a coarse-grained training control instruction of the self-driving vehicle based on the model parameter and the training parameter; and calculate a value of a loss function based on the coarse-grained training control instruction; and an updating unit 208 configured to update the model parameter when the value of the loss function does not meet a preset condition, where the calculation unit 202 is further configured to calculate an updated coarse-grained training control instruction of the self-driving vehicle based on an updated model parameter and the training parameter, and recalculate the value of the loss function until the value of the loss function meets the preset condition; and the determining unit 204 is further configured to determine a model parameter corresponding to the value of the loss function that meets the preset condition as a final model parameter of the control instruction decision model.

It may be understood that the loss function Loss1 includes $Loss1=|v \cos \alpha - v \sin \alpha - Q|^2$, where $v$ represents a current speed of the self-driving vehicle, $\alpha$ represents an angle between a current driving direction of the self-driving vehicle and a lane in which the self-driving vehicle is located, and Q represents a matching degree between the coarse-grained training control instruction and a preset coarse-grained training control instruction corresponding to the training parameter.

It may be understood that the calculation unit 202 is further configured to calculate an updating gradient of the model parameter; and the updating unit 208 is configured to calculate the updated model parameter based on the updating gradient, a preset updating coefficient, and the model parameter on which updating is to be performed.

It may be understood that the judging unit 203 is further configured to determine whether the coarse-grained training control instruction is to be executed; and the calculation unit 202 is configured to, when the coarse-grained training control instruction is to be executed, calculate the updating gradient using a first preset relationship, where the first preset relationship indicates that the updating gradient is equal to a partial derivative value of a first loss function with respective to the model parameter, and the first loss function is as follows. $Loss1=v \cos \alpha - v \sin \alpha - Q|^2$, where $v$ represents a current speed of the self-driving vehicle, $\alpha$ represents an angle between a current driving direction of the self-driving vehicle and a lane in which the self-driving vehicle is located, and Q represents a matching degree between the coarse-grained training control instruction and a preset coarse-grained training control instruction corresponding to the training parameter; or when the coarse-grained training control instruction is not to be executed, calculate the updating gradient using a second preset relationship, where the second preset relationship indicates that the updating gradient is equal to a partial derivative value of a second loss function with respective to the model parameter, and the second loss function is as follows. $Loss2=|v \sin \alpha-Q|^2$.

The vehicle control apparatus 200 according to this embodiment of the disclosure may be corresponding to an execution body in the vehicle control method according to the embodiments of the disclosure, and the foregoing and other operations and/or functions of modules in the vehicle control apparatus 200 are respectively used to implement corresponding procedures in the vehicle control method. For brevity, details are not described herein again.

Figure 6:
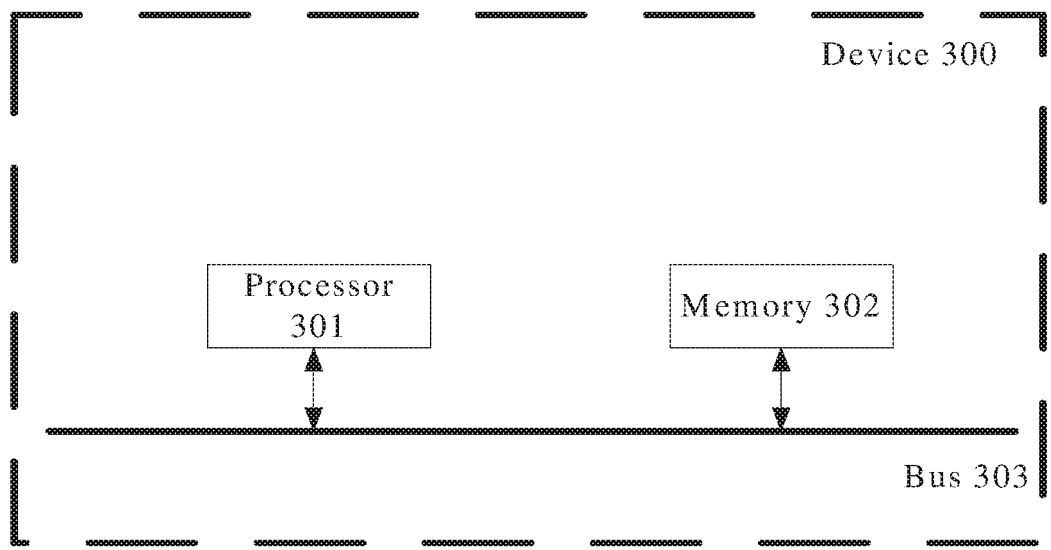
FIG. 6 is a schematic block diagram of a vehicle control device according to an embodiment of the disclosure.

FIG. 6 is a schematic block diagram of a vehicle control device 300 according to an embodiment of the disclosure. As shown in FIG. 6, the device 300 includes a processor 301, a memory 302, and a bus 303. The bus 303 is configured to connect the processor 301 and the memory 302 such that the processor 301 and the memory 302 communicate with each other using the bus 303. The memory 302 is configured to store executable program code. The processor 301 runs, by reading the executable program code stored in the memory 302, a program corresponding to the executable program code.

The processor 301 is further configured to perform a vehicle control method, where the vehicle control method includes, when a self-driving vehicle is in a self-driving status, obtaining driving status information of the self-driving vehicle and first driving environment information of the self-driving vehicle; calculating a coarse-grained control instruction of the self-driving vehicle based on the driving status information, the first driving environment information, and a control instruction decision model, where the coarse-grained control instruction is used to control a driving manner of the self-driving vehicle, and the control instruction decision model is obtained through training based on training driving status information of the self-driving vehicle in a training status and training driving environment information of the self-driving vehicle in the training status; determining, based on second driving environment information, whether the coarse-grained control instruction is to be executed, where the second driving environment information includes driving environment information corresponding to the coarse-grained control instruction when the self-driving vehicle is in the self-driving status; when the coarse-grained control instruction is to be executed, determining, based on lane information and the driving status information of the self-driving vehicle, a fine-grained control instruction corresponding to the coarse-grained control instruction, where the fine-grained control instruction is used to control a driving parameter of the self-driving vehicle, and the lane information includes information about a lane that is corresponding to the coarse-grained control instruction and that is on a road on which the self-driving vehicle drives; and outputting the fine-grained control instruction.

The vehicle control device 300 according to this embodiment of the disclosure may be corresponding to an execution body in the vehicle control method according to the embodiments of the disclosure, and the foregoing and other operations and/or functions of modules in the vehicle control device 300 are respectively used to implement corresponding procedures in the vehicle control method. For brevity, details are not described herein again.

All or some of the foregoing embodiments may be implemented through software, hardware, firmware, or any combination thereof. When the software is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of the disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any available medium accessible to a computer or a data storage device, such as a server or a data center integrating one or more available media. The available medium may be a magnetic medium (for example, a floppy disk, a hard disk, or a magnetic tape), an optical medium (for example, a DVD), a semiconductor medium (for example, a solid-state drive (SSD)), or the like.

The invention claimed is:

1. A method, comprising:
    obtaining driving status information of a self-driving vehicle and first driving environment information of the self-driving vehicle when the self-driving vehicle is in a self-driving status, wherein the driving status information comprises a current speed of the self-driving vehicle;
    obtaining a control instruction decision model through training based on training driving status information of the self-driving vehicle in a training status and training driving environment information of the self-driving vehicle in the training status;
    calculating a coarse-grained control instruction of the self-driving vehicle based on the driving status information, the first driving environment information of a target vehicle and the self-driving vehicle, and the control instruction decision model, wherein the coarse-grained control instruction controls a driving manner of the self-driving vehicle, and wherein the coarse-grained control instruction comprises straight driving in a lane that is currently being used by the self-driving vehicle;
    executing, based on second driving environment information, the coarse-grained control instruction when a preset distance of the self-driving vehicle to the target vehicle is greater than a secure distance, wherein the secure distance is between the target vehicle and the self-driving vehicle that does not cause the self-driving vehicle that is driving at a first current speed to come into contact with the target vehicle that is driving at a second current speed, and wherein the second driving environment information comprises driving environment information corresponding to the coarse-grained control instruction and when the self-driving vehicle is in the self-driving status;
    obtaining, based on lane information of the self-driving vehicle and the driving status information of the self-driving vehicle, a fine-grained control instruction when executing the coarse-grained control instruction, wherein the fine-grained control instruction controls the current speed of the self-driving vehicle to be less than a preset expected speed that is defined for the lane that is currently being used by the self-driving vehicle, wherein the preset expected speed is less than a maximum speed that is defined for the lane, wherein the fine-grained control instruction comprises a value of a throttle of the self-driving vehicle, and wherein the lane information comprises first information about the lane of the self-driving vehicle that corresponds to the coarse-grained control instruction and that is on a road that the self-driving vehicle drives;
calculating the value of the throttle based on a first preset formula when the first current speed is not greater than the preset expected speed, and wherein the first preset formula comprises value of a throttle=preset throttle control coefficient×(preset expected speed−current speed+preset value);
executing the fine-grained control instruction; and
automatically controlling the self-driving vehicle in response to executing the fine-grained control instruction.

2. The method of claim 1, further comprising obtaining the fine-grained control instruction based on the preset expected speed and the current speed.

3. The method of claim 1, wherein the preset throttle control coefficient is based on a brand and a model of the self-driving vehicle.

4. The method of claim 1, wherein the preset throttle control coefficient is 0.2.

5. The method of claim 1, wherein the preset throttle control coefficient is based on a performance of the self-driving vehicle.

6. The method of claim 1, wherein the preset value is 1.

7. An apparatus, comprising:
a memory storing instructions; and
a processor coupled to the memory and configured to execute the instructions that cause the apparatus to be configured to:
obtain driving status information of a self-driving vehicle and first driving environment information of the self-driving vehicle when the self-driving vehicle is in a self-driving status, wherein the driving status comprises a current speed of the self-driving vehicle;
obtain a control instruction decision model through training based on training driving status information of the self-driving vehicle in a training status and training driving environment information of the self-driving vehicle in the training status;
calculate a coarse-grained control instruction of the self-driving vehicle based on the driving status information, the first driving environment information of a target vehicle in relation to and the self-driving vehicle, and the control instruction decision model, wherein the coarse-grained control instruction controls a driving manner of the self-driving vehicle, and wherein the coarse-grained control instruction comprises straight driving and in a lane that is currently being used by the self-driving vehicle;
executed, based on second driving environment information, the coarse-grained control instruction when a preset distance of the self-driving vehicle to the target vehicle is greater than a secure distance, wherein the secure distance is between the target vehicle and the self-driving vehicle that does not cause the self-driving vehicle that is driving at a first current speed to come into contact with the target vehicle that is driving at a second current speed, and wherein the second driving environment information comprises driving environment information corresponding to the coarse-grained control instruction and when the self-driving vehicle is in the self-driving status;
obtain, based on lane information of the self-driving vehicle and the driving status information of the self-driving vehicle, the coarse-grained control instruction to control a parameter of the self-driving vehicle associated with the coarse-grained control instruction when executing the coarse-grained control instruction, wherein a fine-grained control instruction controls the current speed of the self-driving vehicle to be less than a preset expected speed that is defined for the lane that is currently being used by the self-driving vehicle, wherein the preset expected speed is less than a maximum speed that is defined for the lane, wherein the fine-grained control instruction comprises a value of a throttle of the self-driving vehicle, and wherein the lane information comprises first information about the lane of the self-driving vehicle that corresponds to the coarse-grained control instruction that is on a road the self-driving vehicle drives;
calculate the value of the throttle based on a first preset formula when the first current speed is not greater than the preset expected speed, and wherein the first preset formula comprises value of a throttle=preset throttle control coefficient×(preset expected speed−current speed+preset value);
execute the fine-grained control instruction; and
automatically control the self-driving vehicle in response to executing the fine-grained control instruction.

8. The apparatus of claim 7, wherein the instructions further cause the apparatus to be configured to obtain the fine-grained control instruction based on the preset expected speed and the current speed.

9. The apparatus of claim 7, wherein the preset throttle control coefficient is based on a brand and a model of the self-driving vehicle.

10. The apparatus of claim 7, wherein the preset throttle control coefficient is 0.2.

11. The apparatus of claim 7, wherein the preset throttle control coefficient is based on a performance of the self-driving vehicle.

12. A computer program product comprising computer-executable instructions stored on a non-transitory computer-readable storage medium that when executed by a processor, causes an apparatus to:
obtain driving status information of a self-driving vehicle and first driving environment information of the self-driving vehicle when the self-driving vehicle is in a self-driving status, wherein the driving status information comprises a current speed of the self-driving vehicle;
obtain a control instruction decision model through training based on training driving status information of the self-driving vehicle in a training status and training driving environment information of the self-driving vehicle in the training status;
calculate a coarse-grained control instruction of the self-driving vehicle based on the driving status information, the first driving environment information of a target vehicle and the self-driving vehicle, and the control instruction decision model, wherein the coarse-grained control instruction controls a driving manner of the self-driving vehicle, and wherein the coarse-grained control instruction comprises straight driving and in a lane that is currently being used by the self-driving vehicle;

execute, based on second driving environment information, the coarse-grained control instruction when a preset distance of the self-driving vehicle to the target vehicle is greater than a secure distance, wherein the secure distance is between the target vehicle and the self-driving vehicle and that does not cause the self-driving vehicle that is driving at a first current speed to come into contact with the target vehicle that is driving at a second current speed, and wherein the second driving environment information comprises driving environment information corresponding to the coarse-grained control instruction and when the self-driving vehicle is in the self-driving status;

obtain, based on lane information of the self-driving vehicle and the driving status information of the self-driving vehicle, the coarse-grained control instruction to control a parameter of the self-driving vehicle associated with the coarse-grained control instruction when executing the coarse-grained control instruction, wherein the lane information comprises a preset expected speed of the lane in which the self-driving vehicle drives straight, wherein a fine-grained control instruction controls the current speed of the self-driving vehicle to be less than the preset expected speed that is defined for the lane that is currently being used by the self-driving vehicle, and wherein the preset expected speed is less than a maximum speed that is defined for the lane, wherein the fine-grained control instruction comprises a value of a throttle of the self-driving vehicle, and wherein the lane information comprises first information about the lane of the self-driving vehicle that corresponds to the coarse-grained control instruction that is on a road the self-driving vehicle drives;

calculate the value of the throttle based on a first preset formula when the first current speed is not greater than the preset expected speed, and wherein the first preset formula comprises value of a throttle=preset throttle control coefficient×(preset expected speed−current speed+preset value);

execute the fine-grained control instruction; and automatically control the self-driving vehicle in response to executing the fine-grained control instruction.

13. The computer program product of claim 12, wherein the preset throttle control coefficient is based on a brand and a model of the self-driving vehicle.

14. The computer program product of claim 12, wherein the preset throttle control coefficient is 0.2.

15. The computer program product of claim 12, wherein the preset throttle control coefficient is based on a performance of the self-driving vehicle.

16. A device, comprising:
a memory configured to store program code that corresponds to executable program code;
a bus coupled to the memory; and
a processor coupled to the memory and configured for mutual communication using the bus, wherein the processor is configured to execute the program code that causes the device to be configured to:
obtain driving status information of a self-driving vehicle and first driving environment information of the self-driving vehicle when the self-driving vehicle is in a self-driving status, wherein the driving status information comprises a current speed of the self-driving vehicle;

obtain a control instruction decision model through training based on training driving status information of the self-driving vehicle in a training status and training driving environment information of the self-driving vehicle in the training status;

calculate a coarse-grained control instruction of the self-driving vehicle based on the driving status information, the first driving environment information of a target vehicle and the self-driving vehicle, and the control instruction decision model, wherein the coarse-grained control instruction comprises straight driving and controls a driving manner of the self-driving vehicle;

execute, based on second driving environment information, to execute the coarse-grained control instruction when a preset distance of the self-driving vehicle to the target vehicle is greater than a secure distance, wherein the coarse-grained control instruction comprises straight driving in a lane that is currently being used by the self-driving vehicle, wherein the secure distance is between the target vehicle and the self-driving vehicle and that does not cause the self-driving vehicle that is driving at a first current speed to come into contact with the target vehicle that is driving at a second current speed, and wherein the second driving environment information comprises driving environment information corresponding to the coarse-grained control instruction and when the self-driving vehicle is in the self-driving status;

obtain, based on lane information of the self-driving vehicle and the driving status information of the self-driving vehicle, the coarse-grained control instruction to control a parameter of the self-driving vehicle associated with the coarse-grained control instruction when executing the coarse-grained control instruction, wherein a fine-grained control instruction comprises a value of a throttle of the self-driving vehicle, wherein the fine-grained control instruction controls the current speed of the self-driving vehicle to be less than a preset expected speed that is defined for the lane that is currently being used by the self-driving vehicle, wherein the preset expected speed is less than a maximum speed that is defined for the lane, wherein the lane information comprises the preset expected speed of the lane in which the self-driving vehicle drives straight, and wherein the lane information comprises first information about the lane of the self-driving vehicle that corresponds to the coarse-grained control instruction that is on a road the self-driving vehicle drives;

calculate the value of the throttle based on a first preset formula when the first current speed is not greater than the preset expected speed, and wherein the first preset formula comprises value of a throttle=preset throttle control coefficient×(preset expected speed−current speed+preset value);

execute the fine-grained control instruction; and automatically control the self-driving vehicle in response to executing the fine-grained control instruction.

17. The device of claim 16, wherein the preset throttle control coefficient is based on a brand and a model of the self-driving vehicle.

18. The device of claim 16, wherein the preset throttle control coefficient is 0.2.

19. The device of claim 16, wherein the preset throttle control coefficient is based on a performance of the self-driving vehicle.

* * * * *

UNITED STATES PATENT AND TRADEMARK OFFICE
CERTIFICATE OF CORRECTION

| | | |
|---|---|---|
| PATENT NO. | : 12,077,176 B2 | Page 1 of 1 |
| APPLICATION NO. | : 16/730444 | |
| DATED | : September 3, 2024 | |
| INVENTOR(S) | : Songcen Xu et al. | |

It is certified that error appears in the above-identified patent and that said Letters Patent is hereby corrected as shown below:

In the Claims

Claim 16, Column 40, Line 19: "to execute the course-grained" should read "the course-grained"

Signed and Sealed this
First Day of October, 2024

*Katherine Kelly Vidal*

Katherine Kelly Vidal
*Director of the United States Patent and Trademark Office*